(12) United States Patent
Kawabata et al.

(10) Patent No.: US 9,477,879 B2
(45) Date of Patent: Oct. 25, 2016

(54) INFORMATION PROCESSING APPARATUS, INFORMATION PROCESSING METHOD, AND STORAGE MEDIUM FOR OBTAINING A RELATIONSHIP BETWEEN PIECES OF CONTENTS FROM USE HISTORY INFORMATION ABOUT THE CONTENTS

(71) Applicant: CANON KABUSHIKI KAISHA, Tokyo (JP)

(72) Inventors: Takayuki Kawabata, Kawasaki (JP); Shigeo Fukuoka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 14/312,333

(22) Filed: Jun. 23, 2014

(65) Prior Publication Data

US 2015/0003744 A1    Jan. 1, 2015

(30) Foreign Application Priority Data

Jun. 28, 2013 (JP) .................................. 2013-136172
Jul. 26, 2013 (JP) .................................. 2013-155633

(51) Int. Cl.
*G06K 9/00* (2006.01)

(52) U.S. Cl.
CPC ............. *G06K 9/00335* (2013.01); *G06K 9/00* (2013.01)

(58) Field of Classification Search
None
See application file for complete search history.

(56) References Cited

U.S. PATENT DOCUMENTS

| | | | | |
|---|---|---|---|---|
| 8,392,834 B2 * | 3/2013 | Obrador | ............ | G06F 17/30017 715/719 |
| 2010/0306841 A1 * | 12/2010 | Wang | ...................... | G06F 21/36 726/19 |
| 2011/0022982 A1 * | 1/2011 | Takaoka | .............. | G06F 3/04817 715/810 |
| 2012/0313971 A1 * | 12/2012 | Murata | ............ | H04N 21/44008 345/660 |

FOREIGN PATENT DOCUMENTS

JP    2004-185146 A    7/2004

* cited by examiner

*Primary Examiner* — Brian P Werner
(74) *Attorney, Agent, or Firm* — Canon U.S.A., Inc. IP Division

(57) ABSTRACT

There is provided an information processing apparatus capable of recognizing a plurality of movable contents, obtaining movement history information about positions of the recognized contents, determining a relationship between the contents from the movement history information about the positions, and facilitating explanation of the contents by using the relationship. To this end, images of a plurality of contents having order information are projected based on the order information, which of the projected images is selected is detected, a projection unit is caused to project an image of a content related to a source content of the detected image by using a display mode based on a relationship between the source content and the related content. Through such control, the relationship between the source content and the related content is shown in an easy-to-understand manner.

11 Claims, 25 Drawing Sheets

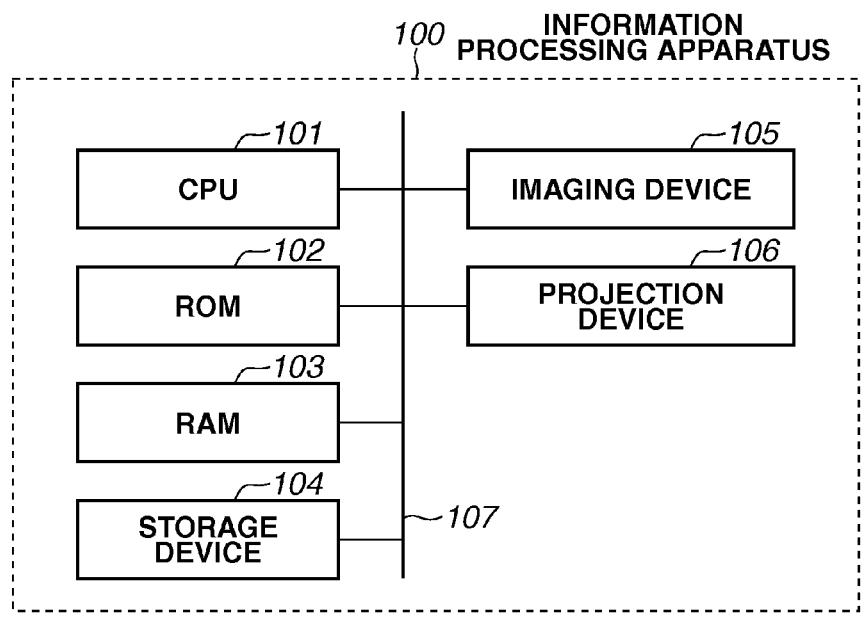
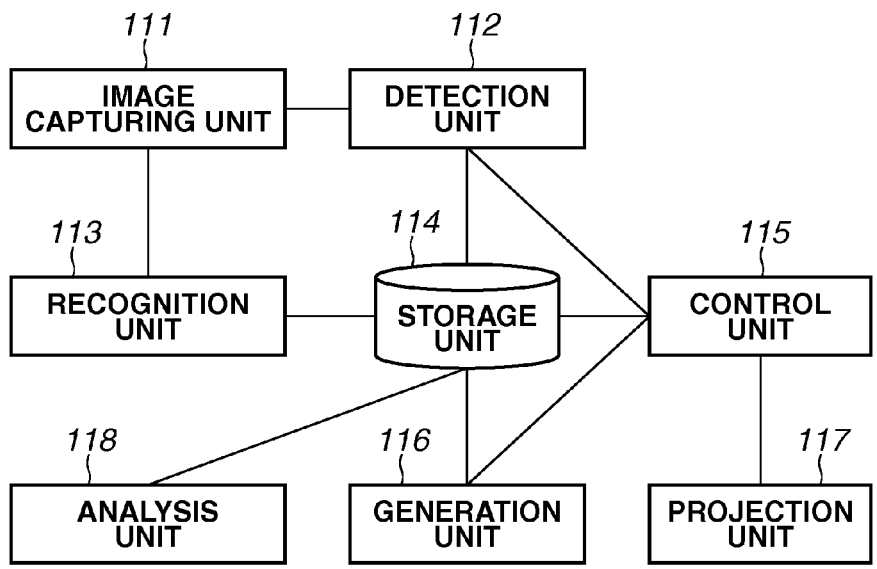

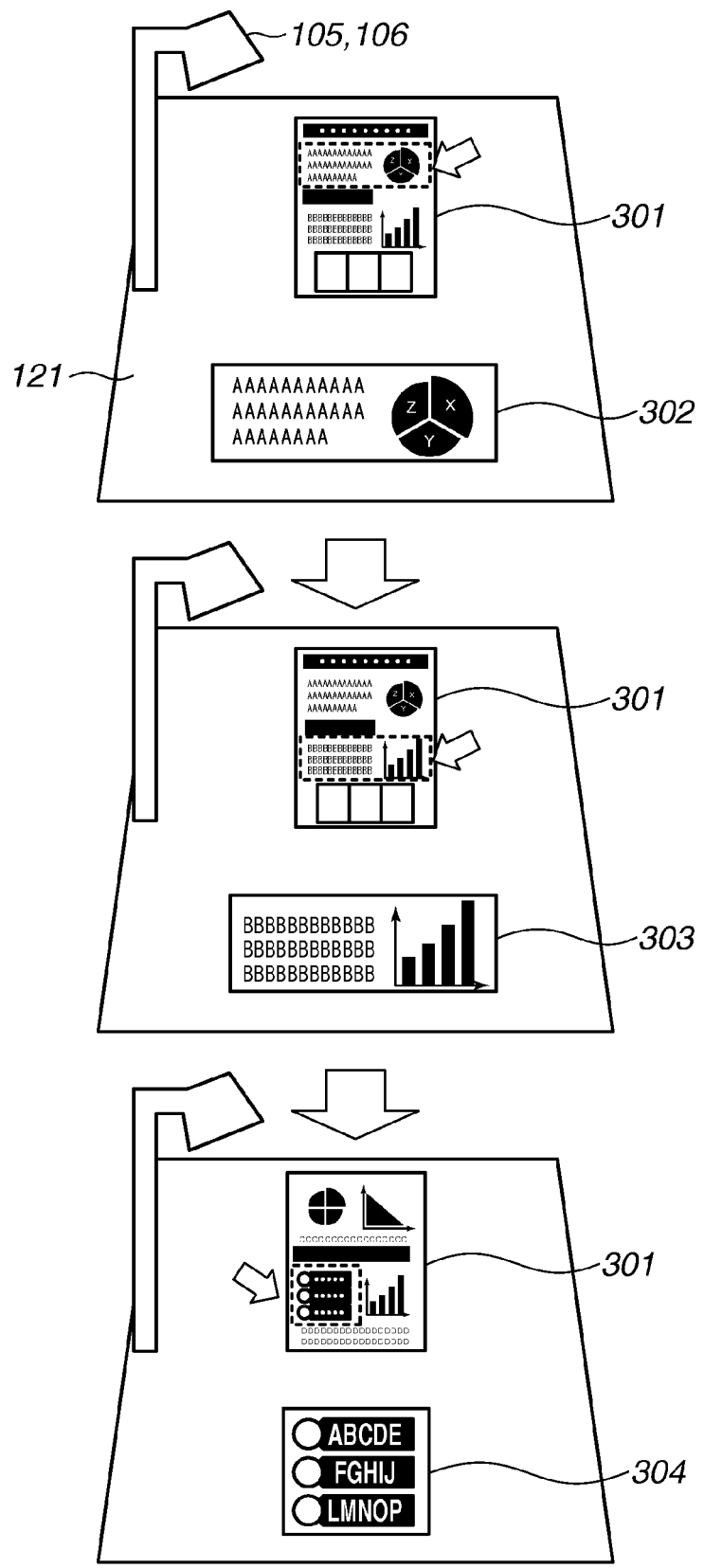

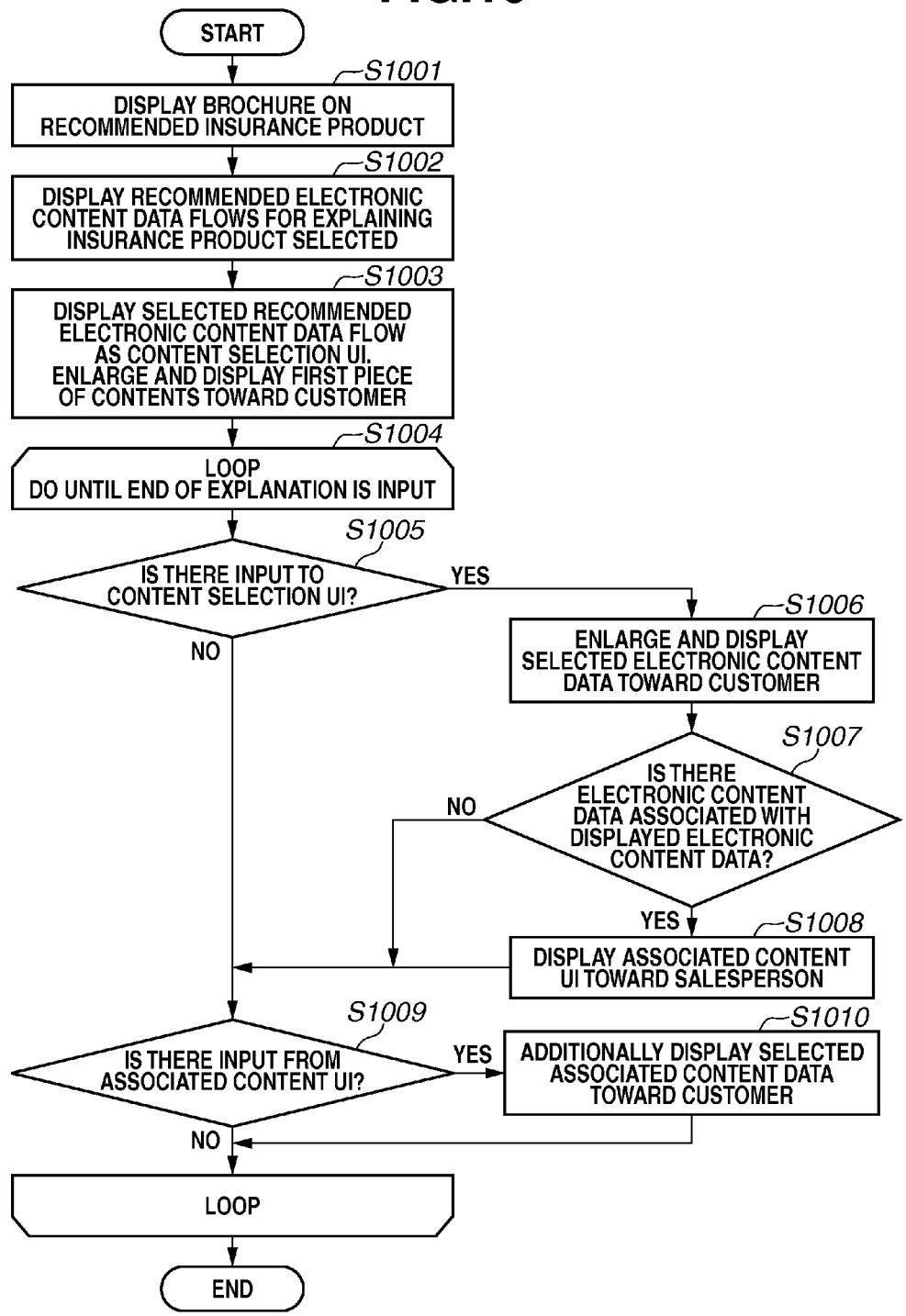

FIG.12

| Log ID | Time | Content ID | x | y | wide | height | event |
|---|---|---|---|---|---|---|---|
| ... | | | | | | | |
| 1000 | 2010-06-09T10:00:15 | 100 | 600 | 500 | 750 | 300 | view |
| 1001 | 2010-06-09T10:01:37 | 100 | 600 | 500 | 750 | 300 | delete |
| 1002 | 2010-06-09T10:01:45 | 200 | 100 | 500 | 600 | 420 | view |
| 1003 | 2010-06-09T10:04:24 | 300 | 1000 | 500 | 530 | 450 | view |
| 1004 | 2010-06-09T10:07:30 | 200 | 100 | 500 | 600 | 420 | delete |
| 1005 | 2010-06-09T10:07:30 | 300 | 1000 | 500 | 530 | 450 | delete |
| 1006 | 2010-06-09T10:07:40 | 400 | 600 | 500 | 460 | 370 | view |
| 1007 | 2010-06-09T10:09:15 | 400 | 600 | 1000 | 460 | 370 | Move |
| 1008 | 2010-06-09T10:09:22 | 500 | 600 | 500 | 400 | 300 | view |
| ... | | | | | | | |

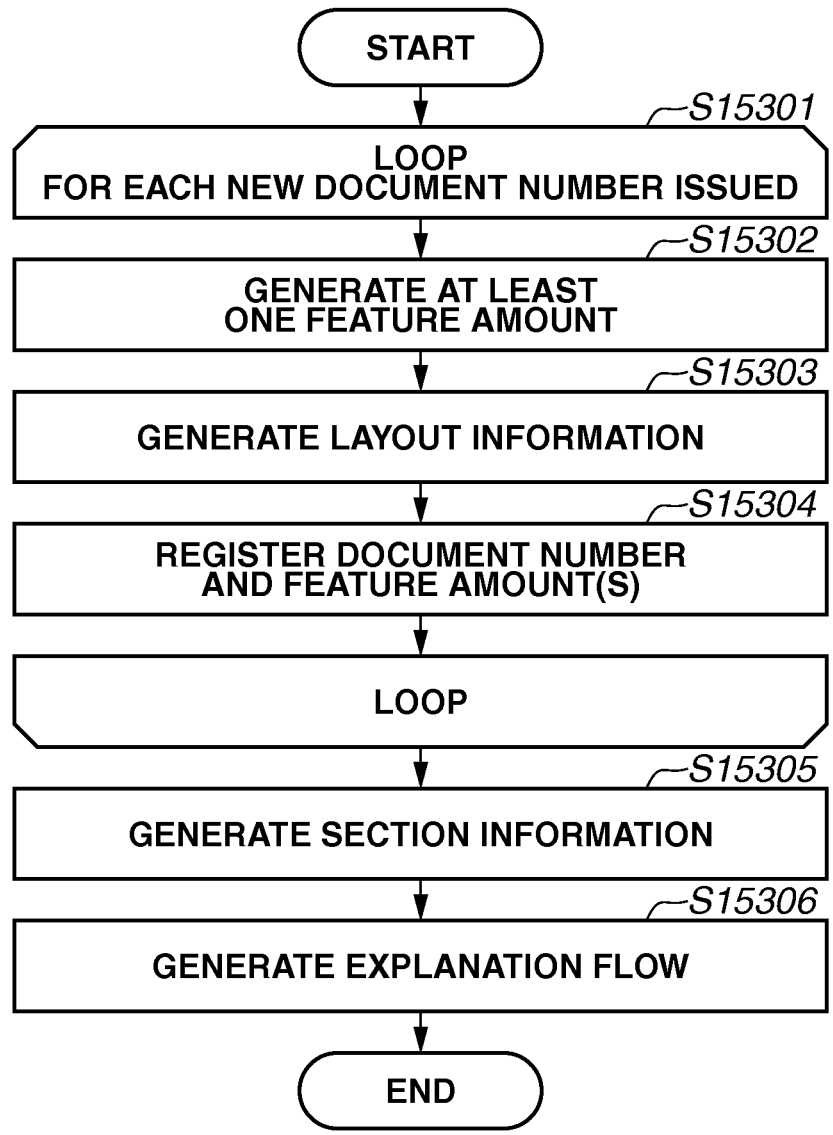

FIG.16A
DOCUMENT USE HISTORY

TIME 1: DOCUMENT NUMBER 1, POSITION (x11, y11),(x12, y12),(x13, y13),(x14, y14)
TIME 2: DOCUMENT NUMBER 1, POSITION (x21, y21),(x22, y22),(x23, y23),(x24, y24)
TIME 3: DOCUMENT NUMBER 1, POSITION (x31, y31),(x32, y32),(x33, y33),(x34, y34)
TIME 4: DOCUMENT NUMBER 1, POSITION (x41, y41),(x42, y42),(x43, y43),(x44, y44)
TIME 5: DOCUMENT NUMBER 1, POSITION (x51, y51),(x52, y52),(x53, y53),(x54, y54)
TIME 6: DOCUMENT NUMBER 1, POSITION (x61, y61),(x62, y62),(x63, y63),(x64, y64)
TIME 7: DOCUMENT NUMBER 1, POSITION (x71, y71),(x72, y72),(x73, y73),(x74, y74)
TIME 8: DOCUMENT NUMBER 1, POSITION (x81, y81),(x82, y82),(x83, y83),(x84, y84)
TIME 9: DOCUMENT NUMBER 1, POSITION (x91, y91),(x92, y92),(x93, y93),(x94, y94)
TIME 10: DOCUMENT NUMBER 1, POSITION (x101, y101),(x102, y102)(x103, y103),(x104, y104)

FIG.16B
GESTURE HISTORY EXAMPLE 1

TIME 1: (x1, y1, z1)
TIME 2: (x1, y1, z2)
TIME 3: (x1, y1, z2), (x2, y2, z3)
TIME 4: (x1, y1, z4), (x3, y3, z5)
TIME 5: (x1, y1, z4)
TIME 6: (x1, y1, z4)
TIME 7: (x1, y1, z4), (x4, y4, z6)
TIME 8: (x1, y1, z4), (x5, y5, z7)
TIME 9: (x1, y1, z8)
TIME 10: (x1, y1, z9)

FIG.16C
GESTURE HISTORY EXAMPLE 2

TIME 1: no touch
TIME 2: touch(x1, y1)
TIME 3: touch(x1, y1), touch(x2, y2)
TIME 4: touch(x1, y1), touch(x3, y3)
TIME 5: touch(x1, y1)
TIME 6: touch(x1, y1)
TIME 7: touch(x1, y1), touch(x4, y4)
TIME 8: touch(x1, y1), touch(x5, y5)
TIME 9: touch(x1, y1)
TIME 10: no touch

FIG.16D
CORRESPONDENCE BETWEEN GESTURE AND DOCUMENT

TIME 1: NO TOUCH
TIME 2: TOUCHING EDGE OF DOCUMENT 1
TIME 3: TOUCHING EDGE OF DOCUMENT 1, TOUCHING (x2,y2) OF DOCUMENT 1
TIME 4: TOUCHING EDGE OF DOCUMENT 1, TOUCHING (x3,y3) OF DOCUMENT 1
TIME 5: TOUCHING EDGE OF DOCUMENT 1
TIME 6: TOUCHING EDGE OF DOCUMENT 1
TIME 7: TOUCHING EDGE OF DOCUMENT 1, TOUCHING (x4,y4) OF DOCUMENT 1
TIME 8: TOUCHING EDGE OF DOCUMENT 1, TOUCHING (x5,y5) OF DOCUMENT 1
TIME 9: TOUCHING EDGE OF DOCUMENT 1
TIME 10: NO TOUCH

FIG.16E
CORRESPONDENCE BETWEEN GESTURE AND AREA WITHIN DOCUMENT

TIME 3: EXPLAINING AREA (xa1,ya1)-(xa2,ya2) OF DOCUMENT 1
TIME 4: EXPLAINING AREA (xb1,yb1)-(xb2,yb2) OF DOCUMENT 1

TIME 7: EXPLAINING AREA (xc1,yc1)-(xc2,yc2) OF DOCUMENT 1
TIME 8: EXPLAINING AREA (xc1,yc1)-(xc2,yc2) OF DOCUMENT 1

FIG.16F
SECTION INFORMATION ABOUT EXPLANATION

TIME 3-4: EXPLAINING AREA (xa1,ya1)-(xb2,yb2) OF DOCUMENT 1

TIME 7-8: EXPLAINING AREA (xc1,yc1)-(xc2,yc2) OF DOCUMENT 1

FIG.16G
USE HISTORY OF AREA WITHIN DOCUMENT

DOCUMENT 1: AREA (xa1,ya1)-(xb2,yb2) TO DOCUMENT 1: AREA (xc1,yc1)-(xc2,yc2)

LAYOUT ANALYSIS RESULT

EXPLANATION AREA

FIG.21
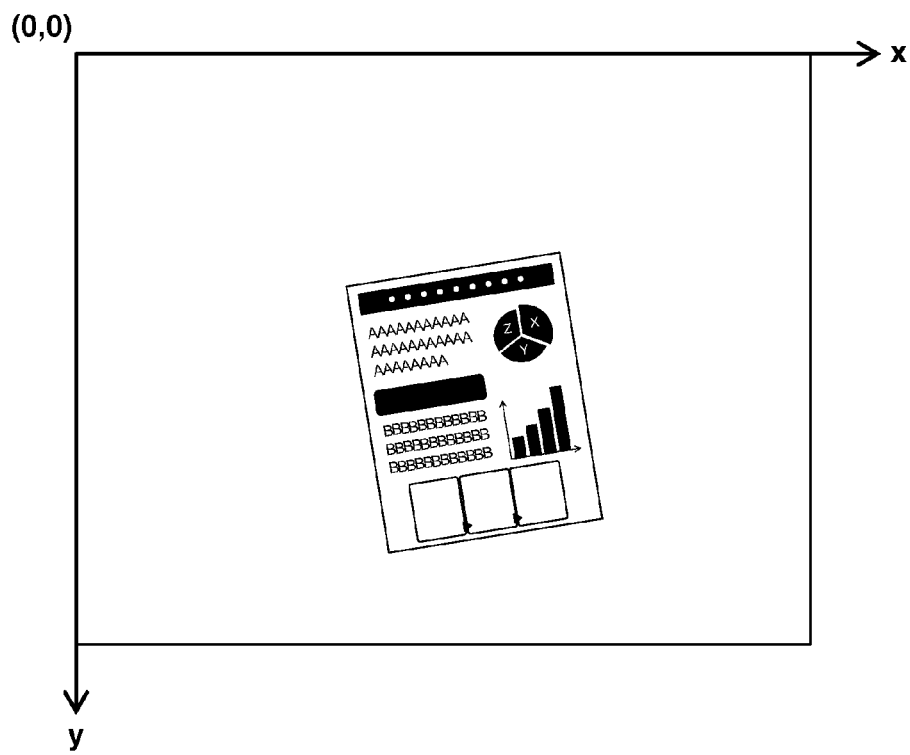
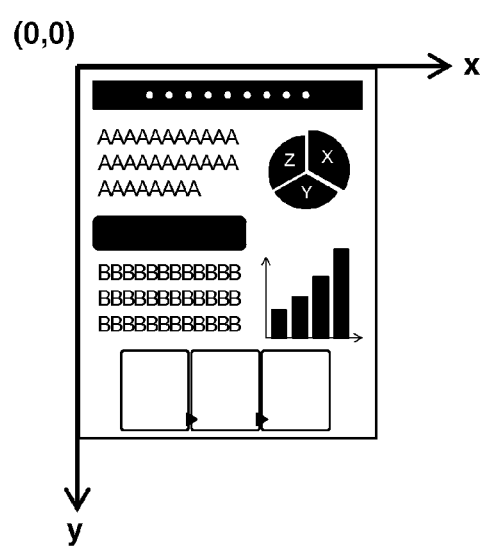

INFORMATION PROCESSING APPARATUS, INFORMATION PROCESSING METHOD, AND STORAGE MEDIUM FOR OBTAINING A RELATIONSHIP BETWEEN PIECES OF CONTENTS FROM USE HISTORY INFORMATION ABOUT THE CONTENTS

BACKGROUND OF THE INVENTION

1. Field of the Invention

The present invention relates to an information processing apparatus for obtaining a relationship between pieces of contents from use history information about the contents, a method and a storage medium.

2. Description of the Related Art

A salesperson may explain a product to a customer by using brochures and catalogs. There is a system that assists a salesperson on such occasions by instructing the salesperson about a procedure for explaining the brochures and catalogs. For example, Japanese Patent Application Laid-Open No. 2004-185146 discusses a system in which an experienced salesperson generates a flow of explanation of brochures and catalogs on each product beforehand. When another salesperson actually explains the product, the system assists the salesperson by displaying on a monitor the flow of explanation of the brochures and catalogs previously generated by the experienced salesperson.

Generating an explanation flow beforehand needs a lot of manpower. It may also be risky to depend on the explanation flow along the experience of a single experienced salesperson. It is desired that logs of the explanation of brochures and catalogs by salespeople can be recorded to automatically extract an appropriate explanation flow and know-how from the logs. According to a conventional technique, it is possible to obtain the line of sight, gestures, and voices during explanation by using a camera and a microphone, and extract an order relationship between pieces of contents in the brochures and catalogs that receive attention.

Contents may have relationships other than the order relationship. Examples include a relationship of supplementing contents and one of comparing contents. The conventional technique can only extract the order relationship.

SUMMARY OF THE INVENTION

The present invention is directed to an information processing apparatus capable of appropriately extracting a positional relationship between pieces of contents used for explanation, and facilitating explanation of the contents by using the relationship. The present invention is also directed to a method and a program thereof.

Further features of the present invention will become apparent from the following description of exemplary embodiments with reference to the attached drawings.

BRIEF DESCRIPTION OF THE DRAWINGS

FIGS. 1A, 1B, and 1C illustrate an example of an appearance and configuration of an information processing apparatus according to a first exemplary embodiment.

FIG. 3 illustrates an example of a product explanation flow according to the first exemplary embodiment.

FIG. 10 is a flowchart illustrating a flow for recommending electronic content data according to the first exemplary embodiment.

FIG. 12 illustrates an example of display history information about electronic content data according to the first exemplary embodiment.

FIGS. 15A, 15B, 15C, and 15D are flowcharts illustrating a flow performed by the information processing apparatus according to the second exemplary embodiment.

FIGS. 16A, 16B, 16C, 16D, 16E, 16F, and 16G illustrate history information according to the second exemplary embodiment.

FIG. 21 illustrates an example of an input image to layout analysis processing.

DESCRIPTION OF THE EMBODIMENTS

Figure 1C:
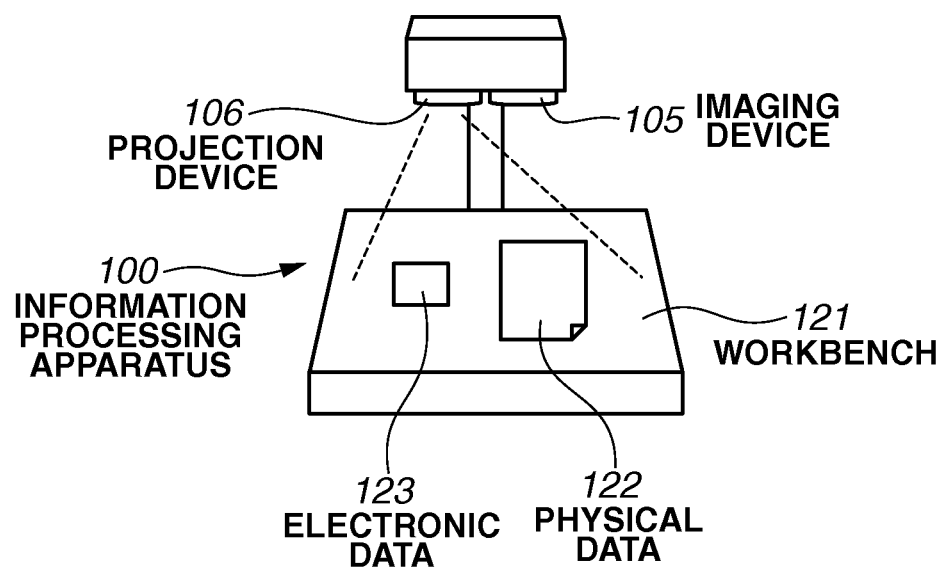

Various exemplary embodiments, features, and aspects of the invention will be described in detail below with reference to the drawings. In the following exemplary embodiments, the present invention is described as a function of an application corresponding to a specific situation. Such a description is given solely by way of illustration, and is not intended to limit the scope of the present invention.

A first exemplary embodiment describes an example where an information processing apparatus reads information from an object or objects placed on a workbench and uses recognized information as data. Examples of situations using such an information processing apparatus include over-the-counter sales where a salesperson and a customer discuss business face to face by using product brochures. The present exemplary embodiment deals with an example where a salesperson at an insurance agency sells a customer an insurance product by using various insurance brochures. Hereinafter, the salesperson and the customer may also be referred to as users.

FIG. 1A is a hardware configuration diagram illustrating an information processing apparatus 100 according to the present exemplary embodiment. In FIG. 1A, a central processing unit (CPU) 101 performs calculations and makes logical determinations for various types of processing, and controls various components connected to a system bus 107. A read-only memory (ROM) 102 stores program data used for the control by the CPU 101, including various processing procedures illustrated in flowcharts to be described below. A random access memory (RAM) 103 is a data memory. The RAM 103 includes a work area of the program data of the CPU 101, a save area of data during error processing, and a load area of the program data. A storage device 104 includes a hard disk and/or a storage device connected outside. The storage device 104 stores various types of data including electronic data according to the present exemplary embodiment, and a program or programs. The CPU 101 reads and executes processing steps and/or programs stored in the ROM 102 or the storage device 104. The processing steps and/or programs may be read from a storage medium such as a disk device, or obtained through network communications, and stored in the ROM 102 or the storage device 104. On such occasions, the CPU 101 functions as a controller. In the present exemplary embodiment, the CPU 101 performs the steps illustrated in the flowcharts and thereby operates as functional units of the information processing apparatus 100 to be described below. An imaging device 105 captures an image of a work space where the users perform operations, and provides the captured image as an input image to the information processing apparatus 100. A projection device 106 projects a video image including electronic data and user interface components on a workbench 121 to be described below. In the present exemplary embodiment, the imaging device 105 and the projection device 106 are arranged inside the information apparatus 100, whereas the imaging device 105 and the projection device 106 may be external devices connected by a wired or wireless interface.

FIG. 1B is a diagram illustrating a functional configuration of the information processing apparatus 100 according to the present exemplary embodiment. In FIG. 1B, an image capturing unit 111 is the imaging device 105 such as a camera and a video camera. The image capturing unit 111 captures an image of an object or objects placed on the workbench 121 from above. The image capturing unit 111 according to the present exemplary embodiment has an imaging range that covers the entire top surface of the workbench 121.

In the present exemplary embodiment, the CPU 101 loads the programs stored in the ROM 102 into the RAM 103 and executes the programs to implement the functions of the functional units to be described below. However, in the present exemplary embodiment, the information processing apparatus 100 can be configured to similarly implement the functional units by hardware.

A detection unit 112 includes the CPU 101, the ROM 102, and the RAM 102 (hereinafter, referred to as the CPU 101 etc.). The detection unit 112 detects a plurality of objects, and obtains information indicating the positions of the objects and areas where pieces of information included in the objects exist on the workbench 121. Herein, the objects refer not only to paper documents such as a brochure and a catalog, but also to the user's hand and fingertip. The information included in an object refers to information written on a surface of the object to be read. Examples of the information include characters and images.

A recognition unit 113 includes the CPU 101 etc. The recognition unit 113 determines objects to read, reads the image captured by the image capturing unit 111, and recognizes information included in the read objects. For example, suppose that an object is a document printed on a sheet of paper. The image capturing unit 111 captures a high-resolution image of a range corresponding to the size of the sheet. The recognition unit 113 reads the captured image as a document file, and performs character recognition on the document contents.

A storage unit 114 corresponds to the RAM 103. The storage unit 114 stores various information and data. Examples include information obtained by the information processing apparatus 100 reading the objects, operation history information about the user's operations on the workbench 121, electronic content data generated by a generation unit 116 to be described below, display history information about the electronic content data, and data obtained by an analysis unit 118 to be described below about a relationship between pieces of contents. Herein, a piece of contents refers to an element that constitutes a document, such as a paragraph, a figure, and a predetermined area.

A control unit 115 includes the CPU 101 etc. The control unit 115 controls contents to be displayed to the users via a projection unit 117 to be described below according to motions of the user's hand and fingertip detected by the detection unit 112.

The generation unit 116 includes the CPU 101 etc. Based on storage data stored in the storage unit 114 and instructions from the control unit 115, the generation unit 116 performs trimming to generate new electronic content data and stores the generated electronic content data in the storage unit 114. The generated electronic content data can be projected on the workbench 121 by the projection unit 117.

The projection unit 117 corresponds to the projection device 106. The projection unit 117 projects a projection image generated by the control unit 115 on the top surface of the workbench 121 and the objects placed on the workbench 121.

The analysis unit 118 includes the CPU 101 etc. The analysis unit 118 extracts a relationship between pieces of electronic content data by using the information obtained by the information processing unit 110 reading the objects, the electronic content data generated by the generation unit 116, and the display history information thereof, which are stored in the storage unit 114. Examples of the relationship between pieces of electronic content data include an order relationship, a comparative relationship, and a supplementary relationship. The relationships will be described in detail below. The extracted relationships between the pieces of electronic content data are stored in the storage unit 114.

A recommendation unit 119 includes the CPU 101 etc. According to instructions from the control unit 115, the recommendation unit 119 generates recommendation information about electronic content data for the users by using the relationships between the pieces of electronic content data. The recommendation unit 119 displays the recommendation information to the users via the projection unit 117.

FIG. 1C is a diagram illustrating an example of an appearance of the information processing apparatus 100 according to the present exemplary embodiment. In the present exemplary embodiment, the imaging device 105 is disposed above the workbench 121. Physical data 122 such as a sheet of paper is placed on the workbench 121. The imaging device 105 captures an image of the physical data 122 from above, reads the upward surface to be read, and recognizes information.

The projection apparatus 106 projects a projection image on the top surface of the workbench 121 and the physical data 122. The projection image may include images constituting a user interface and electronic data 123 generated by the information processing apparatus 100.

In the present exemplary embodiment, the imaging device 105 and the projection device 106 are included in the same housing. The imaging device 105 and the projection device 106 may be disposed at respective different positions as long as information about the installation position and imaging view angle of the imaging device 105 and the position and projection view angle of the projection device 106 is known to the information processing apparatus 100 in advance. In the present exemplary embodiment, the projection device 106 projects an image on the top surface of the workbench 121, whereby the information processing apparatus 100 recommends data to the users. It is not limited thereto, and a display device such as an ordinary display may be provided to display recommendation information about the data.

[Acquisition of Relationship between Pieces of Electronic Content Data]

An example of an environment for implementing the present exemplary embodiment will be described below. The following example deals with a case where a salesperson and a customer meet at an insurance agency face to face and the salesperson explains an insurance product to the customer by using insurance brochures.

Figure 2A:
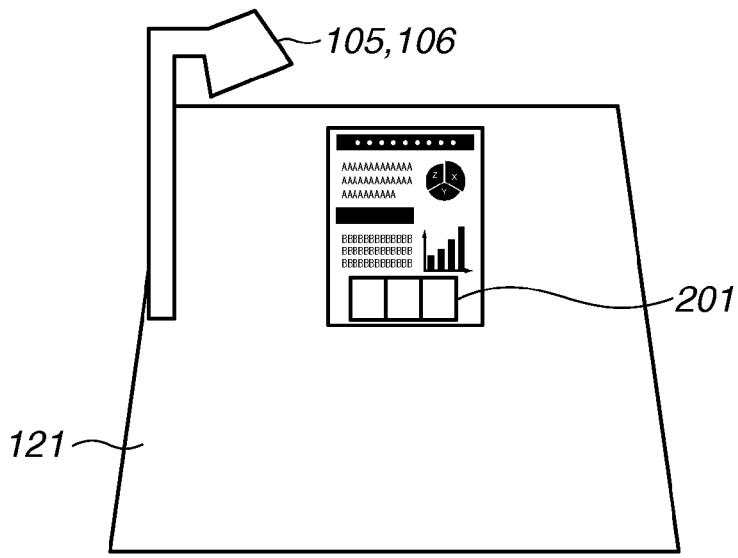
FIGS. 2A, 2B, and 2C illustrate an example of a product explanation according to the first exemplary embodiment.

First, a basic operation example of the present exemplary embodiment will be described with reference to FIGS. 2A, 2B, and 2C. FIG. 2A illustrates a state where a brochure 201 of the insurance product is placed on the workbench 121 of the information processing apparatus 100. The customer is on the near side of the diagram, and the salesperson is on the far side.

Figure 2B:
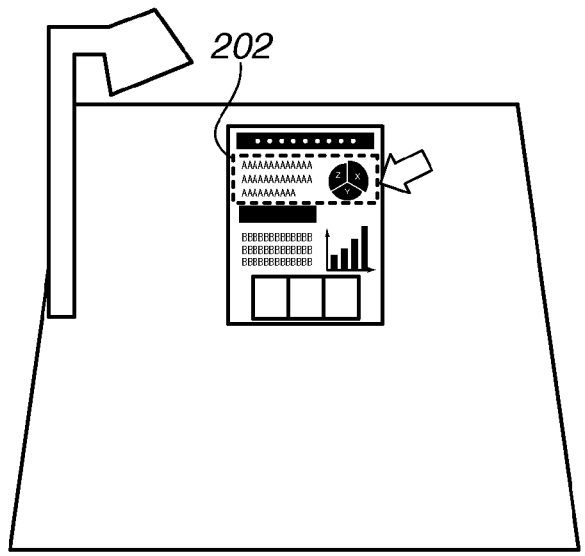
Figure 2C:
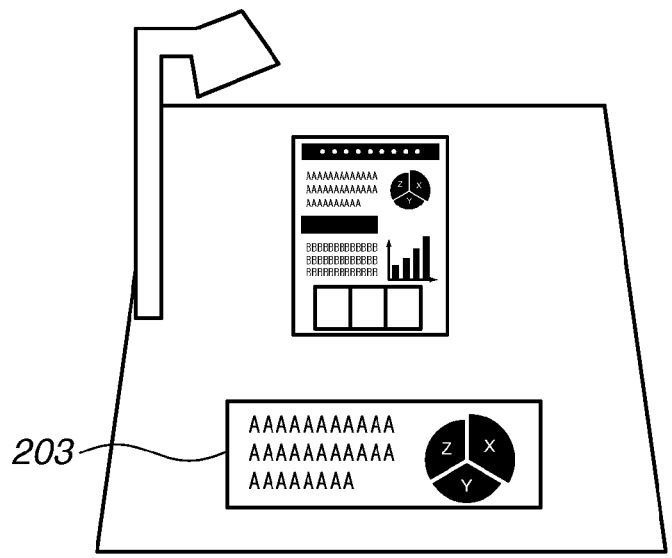

To explain the insurance product, the salesperson specifies the contents (partial area) of electronic data to explain as illustrated in FIG. 2B. The salesperson may specify the partial area by moving a fingertip around the area of the contents to explain, moving a fingertip along a diagonal line of the area, or explicitly specifying diagonal points of the area. The information processing apparatus 100 may explicitly display enclosed areas, so that the user can touch with a fingertip to specify the area of the contents to explain among the displayed areas. The document may be divided into areas by using electronic data that is manually prepared in advance with area information in the form of formal paragraphs or tags. The information processing apparatus 100 may automatically determine areas when reading the brochure 201 of the insurance product, by using a technique for extracting areas from a document image.

The generation unit 116 clips the area of the contents specified by the user. The generation unit 116 then generates new clipped electronic content data. As illustrated in FIG. 2C, the control unit 115 enlarges and displays the generated electronic content data 203 toward the customer. The displayed electronic content data 203 is movable electronic content data of which the size and/or the display position can be changed by touching with a fingertip. A plurality of pieces of electronic content data may be simultaneously displayed.

The displayed electronic content data 203 is recorded in the storage unit 114 in association with information about an identification (ID) number of the salesperson and an ID number of the customer, along with an ID number of the electronic content data, coordinate values of the displayed position, a display size value, and time. As for the recording timing, the information processing apparatus 100 may detect a change of display and perform sampling between the start and end of the change of display at regular sampling intervals. FIG. 12 illustrates an example of display history information about recorded electronic content data. For example, the display history information of FIG. 12 shows the following. Contents having a content ID of 100 were displayed and then hidden one minute and 22 seconds later. Then, contents having a content ID of 200 were displayed, contents having a content ID of 300 were displayed in a juxtaposed manner two minutes and 39 seconds later, and both were hidden three minutes and six seconds later.

Such a display method has the advantage that the pieces of information needed in explaining the product to the customer can be displayed in arbitrary order and sometimes in different sizes to provide flexible explanations according to each individual customer.

Next, a method for extracting a relationship between pieces of electronic content data will be described. As the salesperson explains the insurance product by using the information processing apparatus 100, the display history information in units of the pieces of electronic content data provided between the salesperson and the customer is accumulated in the storage unit 114. The display history information in units of the pieces of electronic content data includes display positions and sizes along with time information. Such information can be used to extract various relationships between the pieces of electronic content data, as well as a conventional simple relationship in terms of display order between the pieces of electronic content data.

With various relationships extracted, an explanation flow can be visualized in a more expressive, easy-to-understand manner. The accuracy of recommendation of electronic content data during explanation can also be improved. The use of the relationships between the pieces of electronic content data will be described below.

First, a method for extracting a display order relationship between pieces of electronic content data is initially described. The display order relationship can be extracted by applying a conventional technique for sequential pattern mining to the display history of the electronic content data to extract frequent sequential patterns. Sequential pattern mining refers to a technique for extracting frequently occurring partial sequences from sequence data, and can be implemented by using a method such as prefix-projected sequential pattern mining (PrefixSpan) and sequential pattern discovery using equivalence classes (SPADE). An extracted sequential pattern is considered to be a display flow of electronic content data which the salesperson frequently uses in explaining the insurance product. For example, as illustrated in FIG. 3, when the salesperson explains a brochure 301 of an instruction product, it is often the case that electronic content data 302, electronic content data 303, and electronic content data 304 are displayed in such an order. Such a display flow can be reused as know-how to explain the insurance product. Not only one but a plurality of display flows is extracted for an insurance product. The display flows can be analyzed in association with attribute information about customers. Such analysis can extract, for example, a display flow that is frequently employed for customers who have no previous knowledge of the insurance product, and a display flow that is frequently employed for customers who are thinking of a transfer from one insurance product to another.

Figure 4:
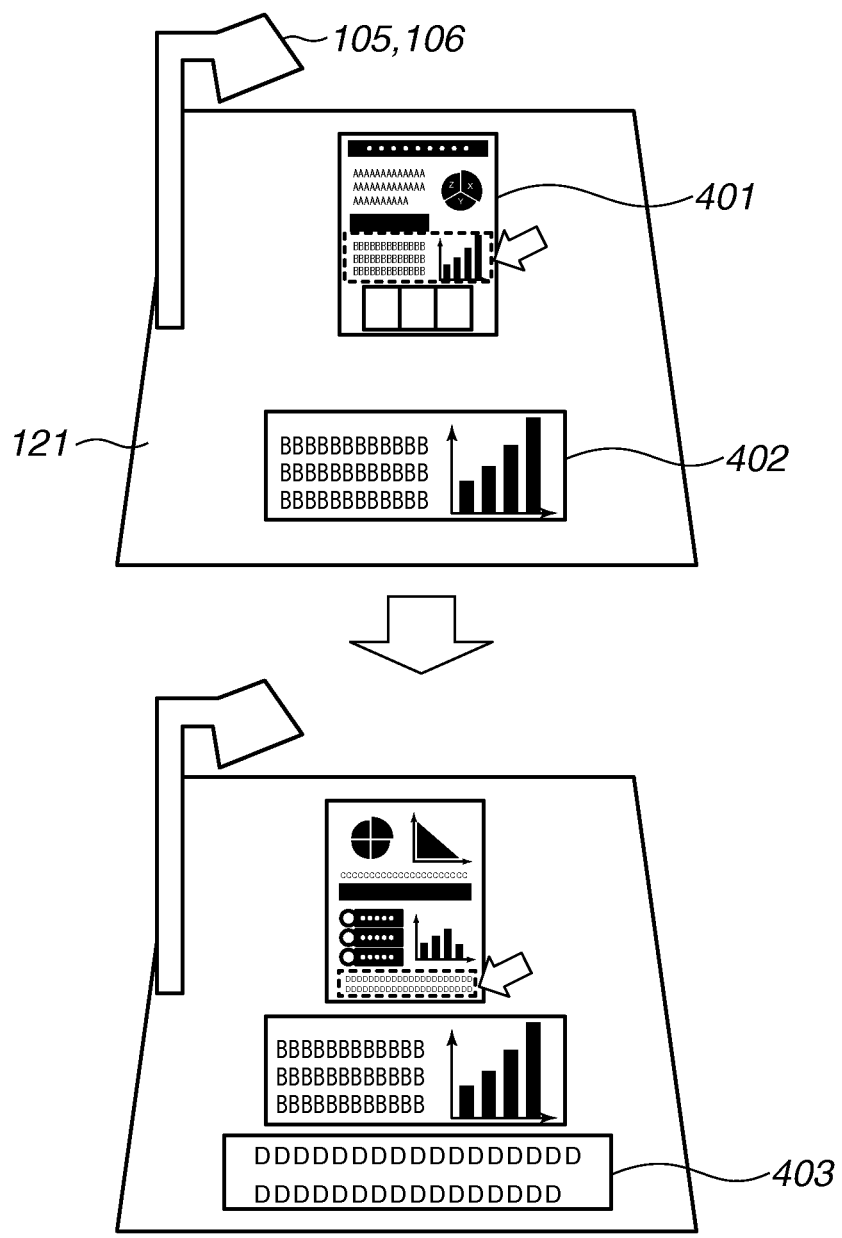
FIG. 4 illustrates an example of supplementation to a product explanation according to the first exemplary embodiment.

Next, the extraction of a relationship between pieces of electronic content data other than the display order relationship will be described. An example of such a relationship is a supplementary relationship. Specifically, as illustrated in FIG. 4, suppose that the salesperson is explaining electronic content data 402 on a brochure 401 of an insurance product. The customer makes a question, and the salesperson additionally displays new electronic content data 403 in order to answer the question. Such electronic content data 403 is considered to have a supplementary relationship with the electronic content data 402.

In the present exemplary embodiment, possible relationships other than the supplementary relationship include an equivalent relationship and a comparative relationship. The equivalent relationship refers to a relationship between pieces of electronic content data that are always used in pairs during explanation. Examples include when the same piece of contents extends to multiple pages of a brochure. Another example is when contents are added afterward and the supplement is provided on a different sheet of paper. In such cases, a plurality of pieces of electronic content data is displayed to explain a single piece of contents, and the pieces of electronic content data can be considered to have an equivalent relationship.

The comparative relationship refers to a relationship that a product is compared with another company's product in features and price. For example, suppose that the salesperson is explaining an insurance product when the salesperson presents a brochure of another company's insurance product and displays pieces of electronic content data describing the features of the respective insurance products side by side. In such a case, the pieces of electronic content data can be considered to have a comparative relationship.

Figure 5:
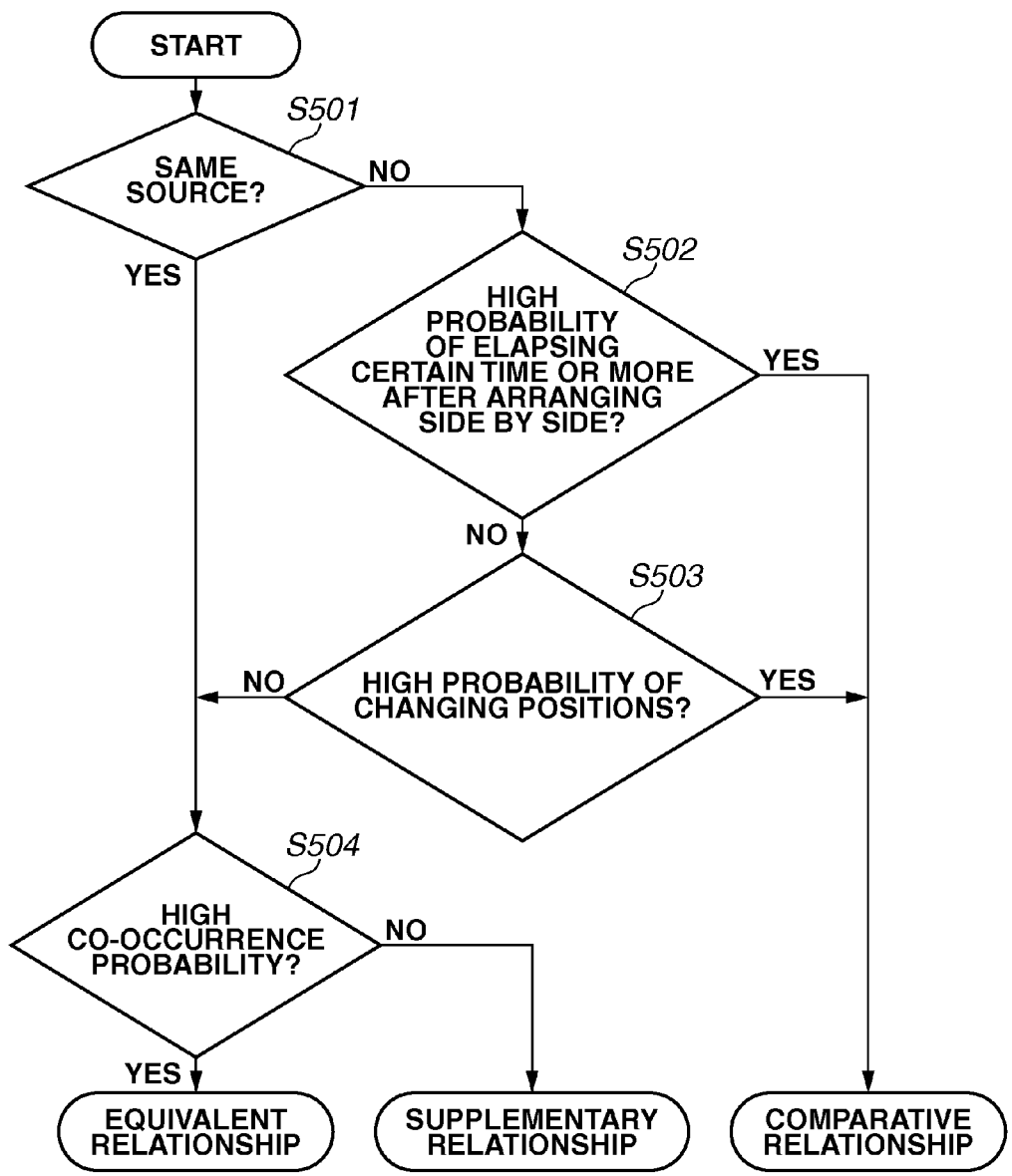
FIG. 5 is a flowchart illustrating a flow for extracting a relationship according to the first exemplary embodiment.

Referring to the flowchart of FIG. 5, a method for extracting a supplementary, equivalent, or comparative relationship between pieces of electronic content data will be concretely described. The input to the flowchart includes a pair of pieces of electronic content data that have been simultaneously displayed within a predetermined position range more than once and display history information thereof. The output of the flowchart is a value that indicates the relationship between the two pieces of electronic content data.

Figure 8A:
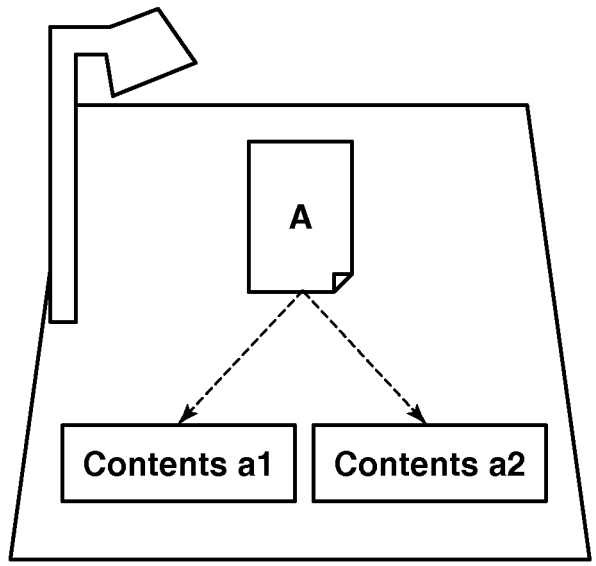
FIGS. 8A and 8B illustrate other examples of display of electronic content data according to the first exemplary embodiment.
Figure 8B:
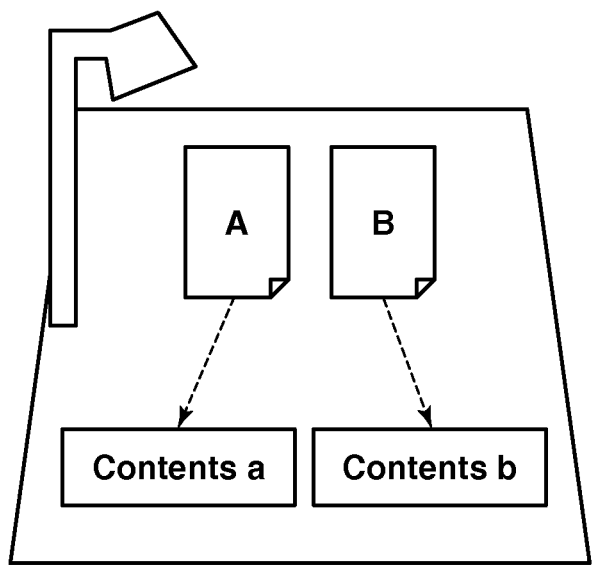

In step S501, the analysis unit 118 branches the processing depending on whether the two pieces of electronic content data have the same source. The source of electronic content data refers to the brochure from which the electronic content data is generated. As illustrated in FIG. 8A, if the two pieces of electronic content data are generated from the same brochure (YES in step S501), the processing proceeds to step S504. The reason is that the two pieces of electronic content data are determined at least not to have a comparative example. As illustrated in FIG. 8B, if the two pieces of electronic content data are not generated from the same brochure (NO in step S501), the processing proceeds to step S502.

Figure 6A:
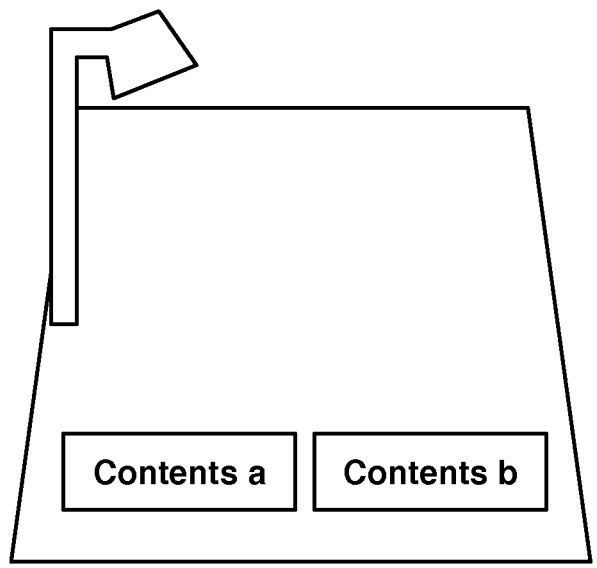
FIGS. 6A and 6B illustrate examples of display of electronic content data according to the first exemplary embodiment.

In step S502, the analysis unit 118 determines whether a certain time or more often elapses with the two pieces of electronic content data side by side as illustrated in FIG. 6A. When a plurality of products is being compared, the customer is likely to take time to compare the products and consider after the salesperson's explanation. If there is a high probability that a certain time or more elapses with the two pieces of electronic content data side by side (YES in step S502), the analysis unit 118 outputs a value indicating that the pieces of electronic content data have a comparative relationship. On the other hand, if there is a low probability that a certain time or more elapses with the two pieces of electronic content data side by side (NO in step S502), the processing proceeds to step S503. Herein, the probability is calculated as follows. For example, suppose that a pair of pieces of electronic content data has been simultaneously displayed five times. If a certain time or more elapsed four times with the pair of pieces of electronic content data side by side, the analysis unit 118 calculates the probability to be 4/5 (80%). If the probability is higher than a predetermined threshold (for example, 60%), the analysis unit 118 determines that the pair of pieces of electronic content data is determined to have a comparative relationship. The analysis unit 118 may perform the steps of FIG. 5 by using a probability or by using information about the number of times.

Figure 6B:
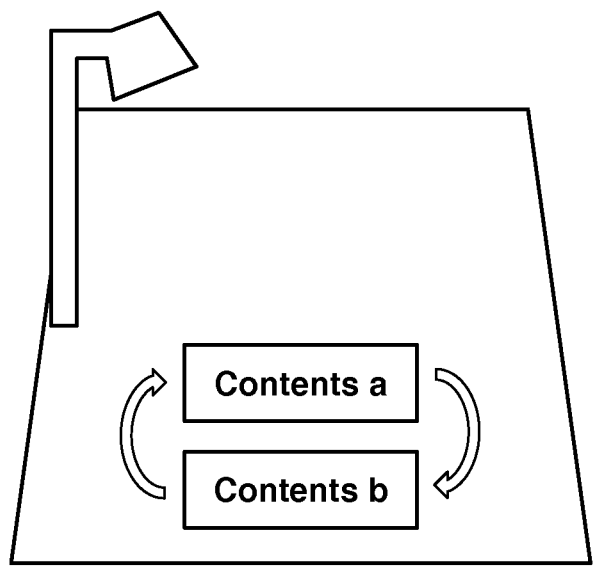

In step S503, the analysis unit 118 determines whether the two pieces of electronic content data frequently change their positions as illustrated in FIG. 6B. For example, when a person compares brochures of two products, the person often makes a motion of switching the positions of the brochures to have a good view for comparison. Similar motions are considered to be made with electronic content data. If there is a high probability that the two pieces of electronic content data frequently change their positions (YES in step S503), the analysis unit 118 outputs a value indicating that the pieces of electronic content data have a comparative relationship. If there is a low probability that the two pieces of electronic content data frequently change their positions (NO in step S504), the processing proceeds to step S504.

In step S504, the analysis unit 118 determines whether there is a high probability that the two pieces of electronic content data co-occur, i.e., are simultaneously displayed. If there is a high probability of co-occurrence between the two pieces of electronic content data (YES in step S504), the analysis unit 118 outputs a value indicating that the pieces of electronic content data have an equivalent relationship. On the other hand, if there is a low probability of co-occurrence between the two pieces of electronic content data (NO in step S504), the analysis unit 118 outputs a value indicating that the pieces of electronic content data have a supplementary relationship.

The method for extracting a relationship between pieces of electronic content data has been described above with reference to the flowchart of FIG. 5. The foregoing extraction method is just an example. The analysis unit 118 extracts a relationship between pieces of data not only based on the display order of the data but also by using the display positions and moving tracks of the data and information about the sources of the data. The example of the extraction method according to the flowchart of FIG. 5 uses the information about the sources of the data. If such information is not available, step S501 may be omitted.

Other examples of operations on contents that can be used to extract a relationship between pieces of data include a change of the display size of electronic content data. For example, if two pieces of electronic content data are successively enlarged and reduced in size, the pieces of electronic content data may be considered to be being compared. In such a case, the analysis unit 118 may output the value indicating a comparative relationship. If a plurality of pieces of electronic content data is displayed side by side in different sizes, the analysis unit 118 may extract the order of interest of the customer from the display sizes, as well as a comparative relationship. If pieces of contents are displayed in large sizes for comparison, the analysis unit 118 may determine the comparative relationship between the pieces of contents to be significant.

Suppose that there is a plurality of brochures of which no electronic content data has been extracted. Even in such a case, a relationship between the pieces of contents can be obtained from the positional relationship between the plurality of arranged brochures and/or the motions of the user's fingertip. For example, if two brochures are placed side by side to compare contents such as prices, the salesperson would arrange the brochures physically close to each other and point with a fingertip for explanation. Such characteristic motions (operations) can be detected to output a relationship between the pieces of contents in the documents. It will be understood that characteristic motions (operations) of the users can be used to extract a relationship between pieces of electronic content data. For example, if pointing motions (operations) are repeated between pieces of electronic content data, the pieces of electronic content data are considered to have a comparative relationship.

Arbitrary data that the users generate by handwriting can be recognized by the recognition unit 113 and regarded as electronic content data. A relationship of such electronic content data with other electronic content data can be similarly extracted.

[Recommendation of Electronic Content Data]

Next, a method for improving efficiency of the operation of explaining an insurance product by using extracted relationships between pieces of electronic content data will be described. The relationships between the pieces of electronic content data extracted from the display history information about the electronic content data, accumulated during the operations of explaining an insurance product, are considered to be know-how to explain the insurance product. Such know-how can be visualized to help improve operations. Information about the know-how can be provided to salespeople in the form of recommended electronic content data, whereby the efficiency of the operation of explaining the insurance product can be improved.

Figure 9A:
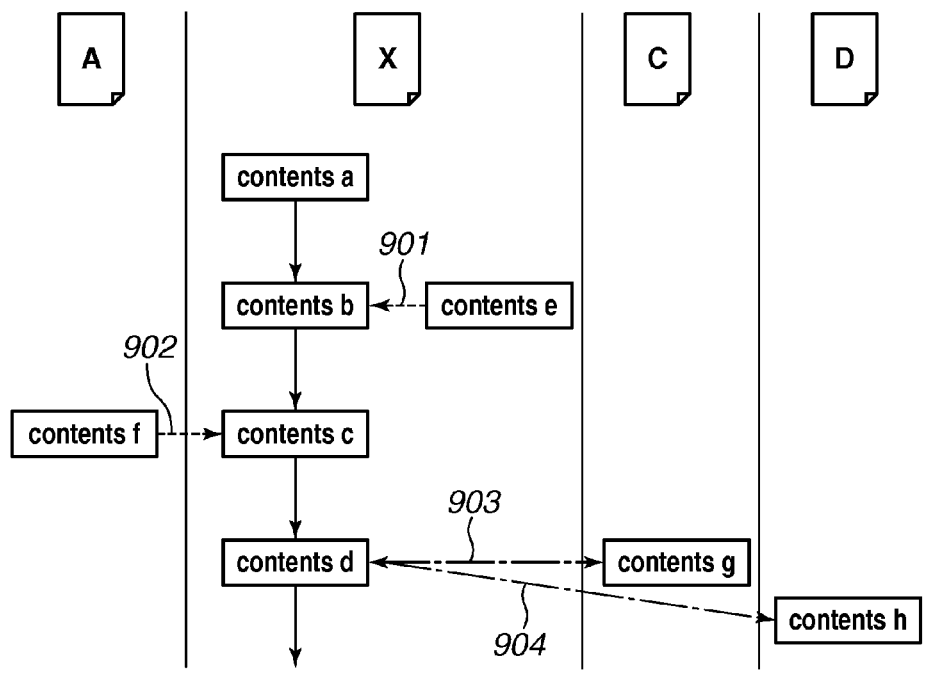
FIGS. 9A and 9B illustrate an example of visualization of a product explanation flow according to the first exemplary embodiment.

First, an example of visualization will be described with reference to FIGS. 9A and 9B. FIG. 9A illustrates an example where relationships between pieces of electronic content data when explaining a brochure X of an insurance product are visualized. Brochures A, C, and D are also illustrated.

Dashed single-headed arrows 901 and 902 represent supplementary relationships. For example, it can be seen that the salesperson uses contents "e" to provide a supplementary explanation when explaining contents "b". Dashed double-headed arrows 903 and 904 represent comparative relationships. For example, it can be seen that the salesperson uses contents "g" of the brochure C of another company's insurance product for comparison when explaining contents "d". The arrows are displayed in different display modes according to the relationship between the pieces of contents. The thicknesses of the arrows indicate the use frequencies. It is shown that the information of the arrows 902 and 903 is frequently used.

Figure 9B:
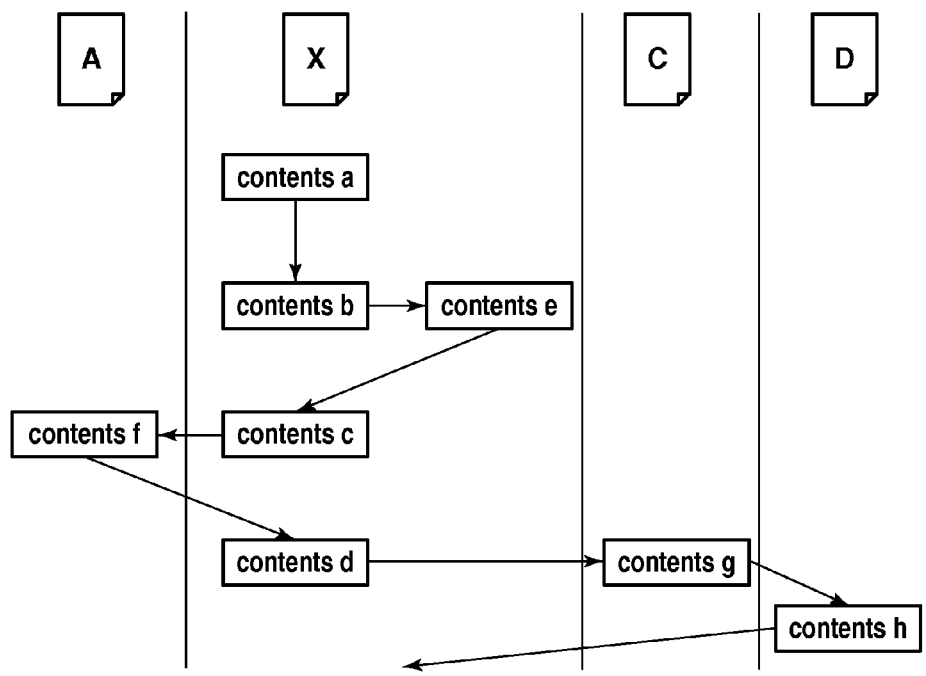

FIG. 9B illustrates an example where only the order relationships between the pieces of electronic content data are extracted and visualized according to a conventional technique. The visualization shows the display order of the pieces of electronic content data, but not the intensions of the display. For example, the following problems may occur when the salesperson views the visualization of the explanation flow and provides explanations. The salesperson displays the contents "e" after the explanation of the contents "b". If the customer fully understands the explanation of the contents "b", the contents "e" of the supplementary relationship do not need to be displayed. However, according to the flow to display the contents e after the content "b", the salesperson may mistake the contents "e" as needed to be displayed. If the customer is not interested in another companies' insurance product, the comparison information about the other company does not need to be presented. However, according to the flow to explain the contents "g" after the contents "d", the salesperson may mistake the contents "g" as needed to be displayed. If the intentions to display the pieces of electronic content data with are shown, the salesperson can determine to skip the display and explanation of unnecessary contents.

Figure 7A:
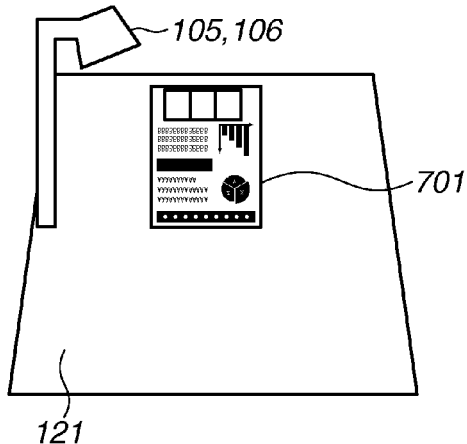
FIGS. 7A, 7B, 7C, 7D, and 7E illustrate an example of recommendation of electronic content data according to the first exemplary embodiment.

Next, an example of recommendation of electronic content data during explanation of an insurance product will be described with reference to the flowchart of FIG. 10, and FIGS. 7A to 7E, and FIGS. 11A to 11D. The salesperson initially inputs information about the customer into the information processing apparatus 100 to start processing. In step S1001, as illustrated in FIG. 7A, the information processing apparatus 100 displays a brochure 701 of an insurance product recommended to be explained to the customer on the workbench 121 as electronic data.

Figure 7B:
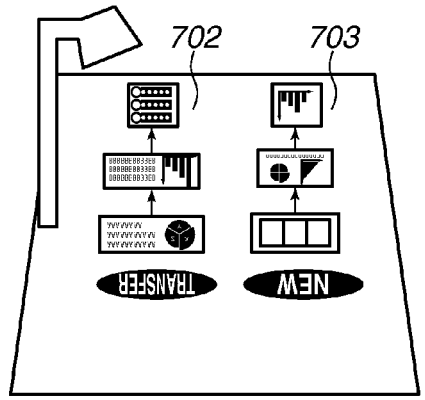

In step S1002, the salesperson selects the brochure 701 of the insurance product, and the information processing apparatus 100 displays recommended electronic content data flows 702 and 703 for explaining the insurance product as illustrated in FIG. 7B. The recommended electronic content data flows 702 and 703 may be frequent sequential patterns of the electronic content data extracted in advance. The electronic content data flows 702 and 703 each include pieces of electronic content data arranged according to order information for explanation use. The electronic content data flows 702 and 703 display thumbnails of the contents.

Figure 7C:
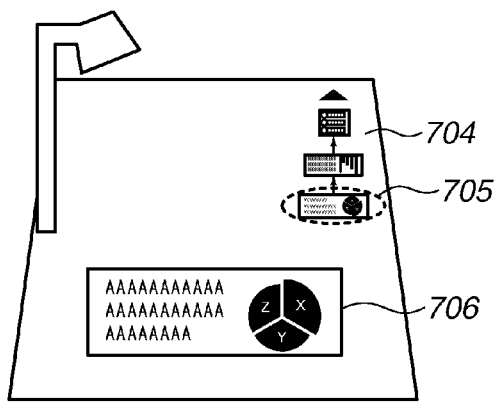

In step S1003, the salesperson selects the recommended electronic content data flow 702, and the information processing apparatus 100 displays the electronic content data flow 702 as a content selection user interface (UI) 704 as illustrated in FIG. 7C. The content selection UI 702 allows selection of the contents. Electronic content data being currently explained is highlighted 705 in the content selection UI 704.

In step S1004, the information processing apparatus 100 repeats the following steps S1005 to S1010 until the salesperson inputs an end of explanation.

In step S1005, if there is an input to the content selection UI 704 (YES in step S1005), the processing proceeds to step S1006. If there is no input to the content selection UI 704 (NO in step S1006), the processing proceeds to step S1009.

Figure 7D:
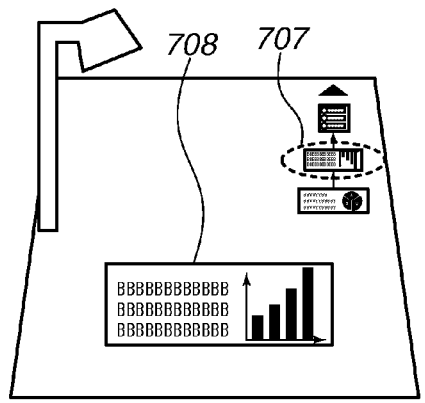

In step S1006, as illustrated in FIG. 7D, the salesperson selects electronic content data 707 by using the content selection UI 704, and the information processing apparatus 100 enlarges and displays 708 the selected electronic content data 707 toward the customer. At that time, the information processing apparatus 100 hides contents that have been displayed so far.

Figure 7E:
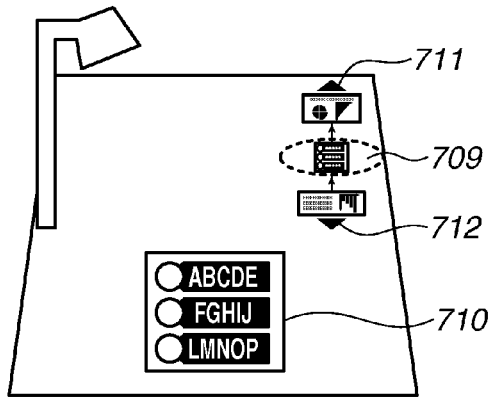

The content selection UI 704 will be described. The salesperson can select arbitrary contents by using the content selection UI 704. For example, FIG. 7E illustrates a situation where the third piece of contents 709 in the electronic content flow 702 is selected, enlarged and displayed 710, and explained by the salesperson. UI components that can advance and move back the electronic content data flow 702, such as arrows 711 and 712, are displayed to allow selection of arbitrary contents. The content selection UI 704 may be displayed so that the piece of contents being currently selected is highlighted and always located near the center of the display range, with one or more pieces of contents simultaneously displayed above and below.

To meet the salesperson's demand to shorten the explanation time for the convenience of the customer, the information processing apparatus 100 may explicitly display less important contents as skippable contents. For such explicit display, the information processing apparatus 100 may change the display mode of the contents. Examples include reducing the display size, increasing transparency, and displaying the degree of importance in numerical value. The decree of importance may be simply determined from the use frequency and/or time used for explanation.

In step S1007, if there is electronic content data (related content data) associated with the electronic content data displayed in step S1006 (YES in step S1007), the processing proceeds to step S1008. On the other hand, if there is no associated electronic content data (related content data) (NO in step S1007), the processing proceeds to step S1009.

Figure 11A:
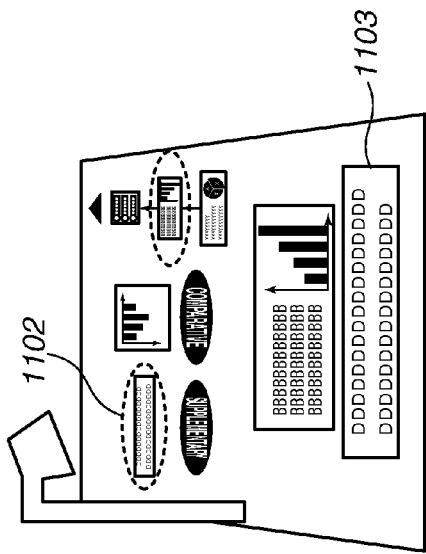
FIGS. 11A, 11B, 11C, and 11D illustrate other examples of recommendation of electronic content data according to the first exemplary embodiment.

In step S1008, as illustrated in FIG. 11A, the information processing apparatus 100 displays an associated content UI 1101 toward the salesperson. The associated content UI 1101 displays the electronic content data (related content data) associated with the electronic content data being displayed, if any, toward the salesperson with an explicit description of the relationship. The relationship may be one between the pieces of electronic content data extracted by using the flowchart of FIG. 5. Since a piece of electronic content data can have a plurality of pieces of associated electronic content data (related content data), the pieces of associated electronic content data may be displayed in groups corresponding to respective relationships. For example, the associated content UI 1101 displays only representative electronic content data in each group with an explicit description of the relationship. As illustrated in FIG. 11C, if the salesperson selects 1104 a relationship, the information processing apparatus 100 may expand and display 1105 the pieces of electronic content data in that group as illustrated in FIG. 11D. The salesperson can refer to and use the associated electronic content data (related content data) and the relationship to provide flexible explanations according to the customer's response and the situation of the explanation.

In step S1009, if there is an input from the associated content UI 1101 (YES in step S1009), the processing proceeds to step S1010. On the other hand, if there is no input from the associated content UI 1101 (NO in step S1009), the processing proceeds to step S1004.

Figure 11B:
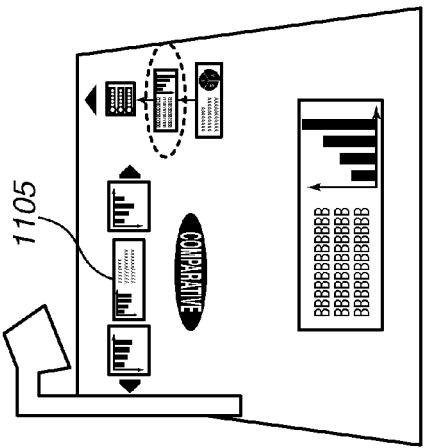
Figure 11C:
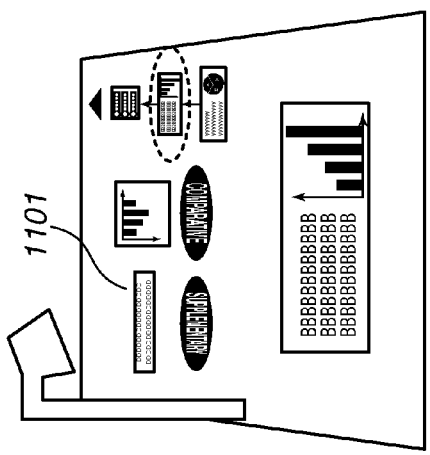
Figure 11D:
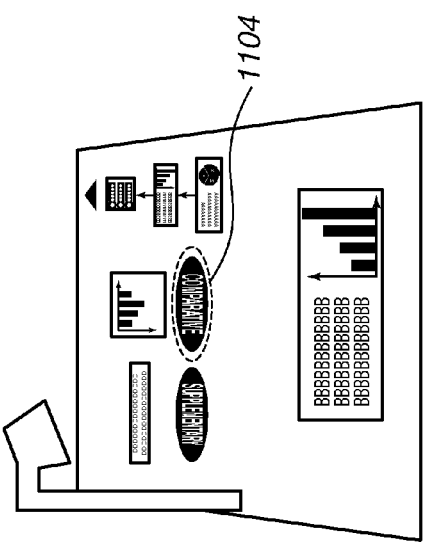

In step S1010, as illustrated in FIG. 11B, the information processing apparatus 100 displays the associated electronic content data (related content data) 1102 selected by the salesperson as selected electronic content data 1103 in addition to the electronic content data being currently explained. The information processing apparatus 100 may determine the display position according to a most frequent layout based on the display history information about the electronic content data in the past.

The information processing apparatus 100 repeats such processing until the salesperson inputs the end of explanation.

In the example described above, the recommendation information for the salesperson about the electronic content data is displayed on the workbench 121. However, it is not limited thereto. A monitor or tablet dedicated to the salesperson may be prepared, and the recommendation information may be displayed on the monitor or tablet.

In such a manner, the information processing apparatus 100 makes an appropriate recommendation of information by using the extracted relationships between the pieces of electronic content data, whereby the efficiency of the operation of explaining the insurance product can be improved.

The electronic content data used for explanation between the salesperson and the customer can be arranged in an optimum layout to generate an original brochure for the customer. The original brochure can be printed so that the customer can take it home. The optimum layout can refer to one that explicitly shows the supplementary, comparative, and/or other relationships in an easy-to-understand manner in addition to the explanation flow.

Up to this point, an example of the environment for implementing the present exemplary embodiment has been described in conjunction with the case where the salesperson and the customer meet at an insurance agency face to face and the salesperson explains an insurance product to the customer by using insurance brochures. The present exemplary embodiment may be widely used in other situations where a salesperson and a customer discuss business face to face, like car dealers and travel agencies. It will be understood that the present exemplary embodiment may be widely used with systems where electronic content data exists and the arrangement of the pieces of electronic content data can be freely changed. Examples of such systems include an electronic whiteboard used in a conference system, a PC, and a tablet.

Figure 13A:
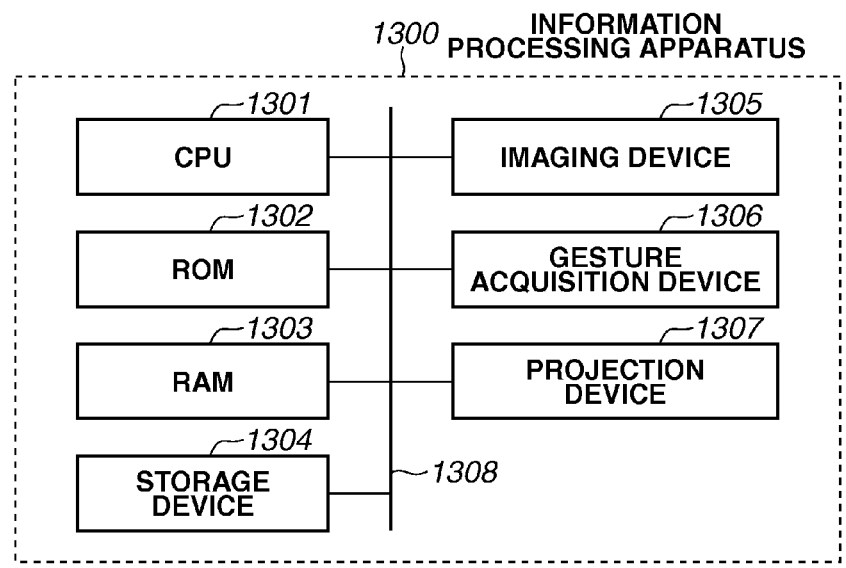
FIGS. 13A, 13B, and 13C illustrate an example of an appearance and configuration of an information processing apparatus according to a second exemplary embodiment.

FIG. 13A is a hardware block diagram illustrating an information processing apparatus 1300 according to a second exemplary embodiment. In FIG. 13A, a CPU 1301 performs calculations and makes logical determinations for various types of processing. The CPU 1301 controls components connected to a system bus 1308. A ROM 1302 stores program data used for the control by the CPU 1301, including various processing procedures illustrated in flowcharts to be described below. A RAM 1303 is a data memory. The RAM 1303 includes a work area of the program data of the CPU 1301, a save area of data during error processing, and a load area of the program data. A storage device 1304 includes a hard disk and/or a storage device connected outside. The storage device 1304 stores various types of data including electronic data according to the present exemplary embodiment, and a program or programs. The CPU 1301 reads and executes processing steps and/or programs stored in the ROM 1302 and/or the storage device 1304. Such processing steps and/or programs may be read from a storage medium such as a disk device, or obtained by network communications, and stored in the ROM 1302 and/or the storage device 1304. On such occasions, the CPU 1301 functions as a controller. In the present exemplary embodiment, the CPU 1301 executes steps illustrated in the flowcharts of FIGS. 15A, 15B, and 15C and thereby operates as functional units of the information processing apparatus 1300 to be described below.

An imaging device 1305 captures an image of a work space where users perform operations. The imaging device 1305 provides the captured image as an input image to the information processing apparatus 1300. A gesture acquisition device 1306 captures an image of the work space where the users perform operations. The gesture acquisition device 1306 thereby obtains the user's gestures, and provides the obtained gestures to the information processing apparatus 1300. A projection device 1307 projects a video image including electronic data and user interface components on a workbench 1322 to be described below. For ease of description, the present exemplary embodiment deals with a case where the position and imaging view angle of the imaging device 1305, the position and imaging view angle of the gesture acquisition device 1306, and the position and projection view angle of the projection device 1307 are fixed. In the present exemplary embodiment, the imaging device 1305, the gesture acquisition device 1306, and the projection device 1307 are configured to be arranged inside the information processing apparatus 1300. However, the imaging device 1305, the gesture acquisition device 1306, and the projection device 1307 may be external devices connected through a wired or wireless interface.

Figure 13B:
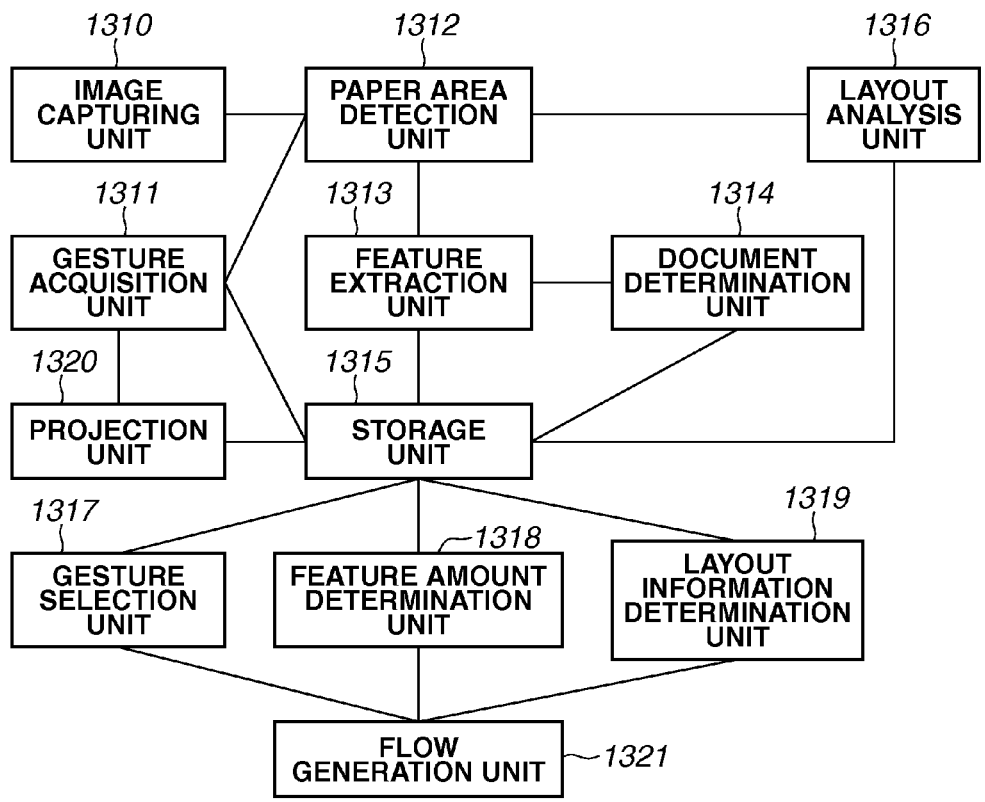

FIG. 13B is a diagram illustrating a functional configuration of the information processing apparatus 1300 according to the present exemplary embodiment. In FIG. 13B, an image capturing unit 1310 is the imaging device 1305 such as a camera and a video camera. The image capturing unit 1310 captures an image of an object or objects placed upward on the workbench 1322 from above, and outputs image data. The image capturing unit 1310 according to the present exemplary embodiment has an imaging range that covers the entire top surface of the workbench 1322.

In the present exemplary embodiment, the CPU 1301 loads the programs stored in the ROM 1302 into the RAM 1303 and executes the programs to implement the functions of the functional units to be described below. In an exemplary embodiment of the present invention, the information processing apparatus 1300 can be configured to similarly implement the functional units by hardware A gesture acquisition unit 1311 includes the CPU 1301, the ROM 1302, and the RAM 1303 (hereinafter, referred to as the CPU 1301 etc.). The gesture acquisition unit 1311 detects the motions of the user's hand and the motion of object held by the hand within the imaging range as a gesture, and obtains information indicating positions and heights over the workbench 1322. If a height is smaller than or equal to a certain value, the gesture acquisition unit 1311 determines that the "workbench is being touched".

A paper area detection unit 1312 includes the CPU 1301 etc. The paper area detection unit 1312 detects a plurality of objects from the image data input from the image capturing unit 1310, and obtains information indicating the positions of the objects on the workbench 1322. Herein, information included in an object refers to information that is written on the surface of the object to be read. Examples of the information include characters and images. The paper area detection unit 1312 perform processing for detecting paper areas on all images input from the image capturing unit 1310 or on images at regular intervals. Based on gesture information from the gesture acquisition unit 1311, the paper area detection unit 1312 further performs processing for screening image data in which entire sheet surfaces are captured without any gestures overlapping the detected paper areas.

A feature extraction unit 1313 includes the CPU 1301 etc. The feature extraction unit 1313 obtains feature amounts for identifying a document from each paper area detected by the paper area detection unit 1312. If no gesture overlaps the paper area detected by the paper area detection unit 1312, the feature extraction unit 1313 inputs the obtained feature amounts into a storage unit 1315.

A document determination unit 1314 includes the CPU 1301 etc. The document determination unit 1314 compares the feature amounts extracted by the feature extraction unit 1313 and the feature amounts stored in the storage unit 1315 to determine a document, and associates the paper area output by the paper area detection unit 1312 with the document. If no matching document is found by the comparison of the feature amounts, the document determination unit 1314 assigns a number distinguishable from the existing document(s). The feature amounts to be compared are those obtained from sheets of paper where the hand is not captured.

A layout analysis unit 1316 obtains a document layout from the image data covering an entire sheet surface, screened by the paper area detection unit 1312. Suppose that the image capturing unit 1310 captures image data illustrated in FIG. 21A. The layout analysis unit 1316 clips paper area image corresponding to a sheet out of the image data by using area information about one paper document detected by the paper area detection unit 1312. FIG. 21B illustrates the clipped paper area image. The layout analysis unit 1316 obtains layout information about the document from the paper area image. Examples of obtainable layout information include character areas, photograph areas, line art areas including graphs and graphics, and lines. The layout information is expressed in terms of coordinates within the paper document.

The storage unit 1315 corresponds to the RAM 1303. The storage unit 1315 stores the following information along with time information:

Gesture information obtained by the gesture acquisition unit 1311

Position information about each paper area detected by the paper area detection unit 1312

Feature amounts of the area(s) where an entire sheet surface is captured without overlapping gestures, detected by the feature detection unit 1313

Document number of each paper area output by the document determination unit 1314

Layout information output by the layout analysis unit 1316

A gesture selection unit 1317 includes the CPU 1301 etc. The gesture selection unit 1317 selects a gesture or gestures used for explanation from the gesture information stored in the storage unit 1315. If the salesperson gives an explanation by using a paper document, the salesperson often makes an operation of holding the sheet to secure the paper document. To make a distinction between the motion of holding a sheet and a gesture of pointing at a position to explain, the gesture selection unit 1317 uses the position information about the sheet stored in the storage unit 1315. For example, if the touched position of the sheet is near an edge of the sheet or the position remains still for more than a certain time, the gesture selection unit 1317 determines that the motion is intended to hold the sheet. Since the operation of holding the sheet is not a gesture for explaining a document, the gesture selection unit 1317 excludes the operation from gestures stored as an explanation history.

A feature amount determination unit 1318 includes the CPU 1301 etc. The feature amount determination unit 1318 determines at least one or more feature amounts from a plurality of feature amounts of each sheet stored in the storage unit 1315. While an insurance product is being explained, feature amounts of one paper document are obtained repeatedly. The feature amount determination unit 1318 makes the foregoing determination to narrow down the feature amounts. For example, suppose that there are a total of N feature amounts. The feature amount determination unit 1318 selects one of the feature amounts, performs matching between the selected feature amount and the remaining (N−1) feature amounts, and determines an average degree of similarity. The feature amount determination unit 1318 determines the average degrees of similarities for all the N feature amounts, and selects the feature amount that maximizes the average degree of similarity. Alternatively, the feature amount determination unit 1318 may select feature amounts having the M highest average degrees of similarity, instead of narrowing down to one feature amount. The feature amount determination unit 1318 may select feature amounts having a certain degree of similarity or higher in absolute value. If the feature amounts can be expressed as an x-dimensional feature vector, the feature amount determination unit 1318 may calculate an average vector of all feature vectors to determine feature amounts. The feature amount determination unit 1318 may select a feature amount that is the closest to an average value.

A layout information determination unit 1319 includes the CPU 1301 etc. The layout information determination unit 1319 determines a piece of layout information about each paper document from among a plurality of pieces of layout information about the paper document stored in the storage unit 1315.

A projection unit 1320 corresponds to the projection device 1306. The projection unit 1320 projects the results detected by the foregoing functional units and various types of electronic data. For example, the projection unit 1320 shows the users a response to a gesture obtained by the gesture acquisition unit 1311. The projection unit 1320 projects a frame according to the position of a sheet detected by the paper area detection unit 1312. The projection unit 1320 projects layout information output by the layout analysis unit 1316 according to an actual sheet of paper.

A flow generation unit 1321 determines the order of used paper documents and the order of areas in each paper document and generates an explanation flow from the gesture information output from the gesture selection unit 1317, the position information about each paper document with respect to the workbench 1322 stored in the storage unit 1315, and the layout information about each paper document determined by the layout information determination unit 1319.

Figure 13C:
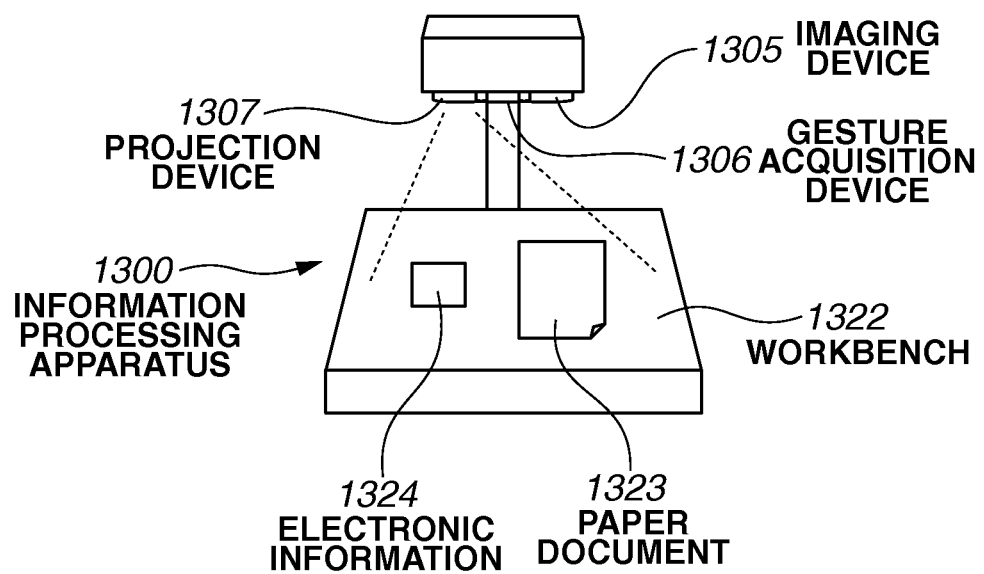

FIG. 13C is a diagram illustrating an example of the appearance of the information processing apparatus 1300 according to the present exemplary embodiment. In the present exemplary embodiment, the imaging device 1305 is arranged above the workbench 1322. The imaging device 1305 captures an image of a paper document 1323 placed upward on the workbench 1322 from above, and reads the upward surface to be read. The gesture acquisition device 1306 similarly captures an image of the top surface of the workbench 1322 from above to obtain the user's operation gestures. The projection device 1307 projects a projection image on the top surface of the workbench 1322. Examples of the projection image include images constituting user interfaces, electronic data stored in the storage unit 1314, and electronic data generated by the information processing apparatus 1300. In the present exemplary embodiment, the imaging device 1305, the gesture acquisition device 1306, and the projection device 1307 are included in the same housing. The imaging device 1305, the gesture acquisition device 1306, and the projection device 1307 may be disposed in respective different positions as long as information about the installation positions and imaging view angles of the respective devices is known to the information processing apparatus 1300 in advance. In the present exemplary embodiment, the projection device 1307 projects the projection image upon the top surface of the workbench 1322. However, it is not limited thereto. A display device such as an ordinary display may be provided. If the information to be obtained as gestures need only include positions touched by the users, a contact sensor or sensors may be arranged on the surface of the workbench 1322 to obtain gestures.

Figure 14A:
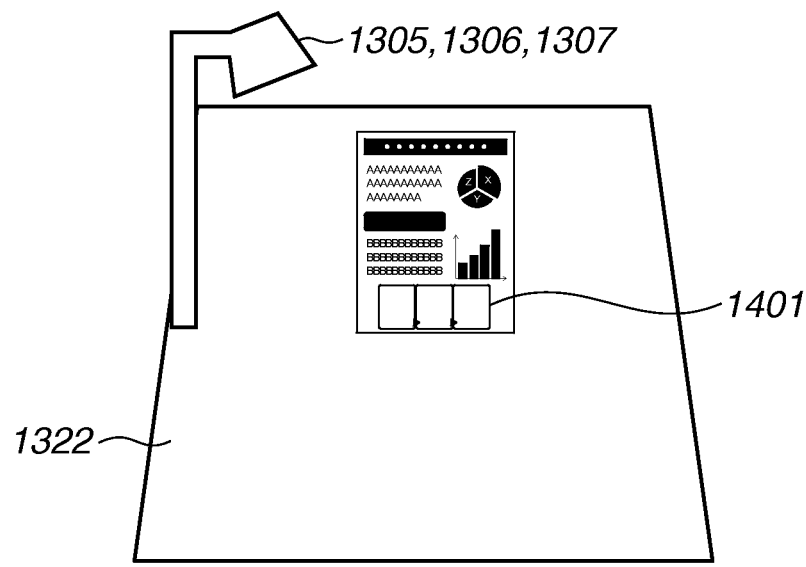
FIGS. 14A and 14B illustrate an example of a product explanation according to the second exemplary embodiment.
Figure 14B:
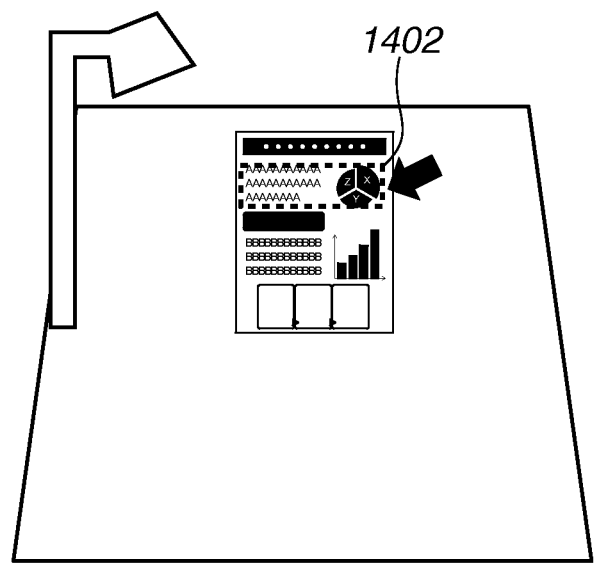

An example of an environment for implementing the present exemplary embodiment will be described below. The following example deals with a case where a salesperson and a customer meet at an insurance agency face to face and the salesperson explains an insurance product to the customer by using an insurance brochure. First, a basic operation example of the present exemplary embodiment will be described with reference to FIGS. 14A, 14B, and 15A to 15D. FIG. 14A illustrates a state where a brochure 1401 of an insurance product is placed on the workbench 1322 of the information processing apparatus 1300. The customer is on the near side of the diagram, and the salesperson on the far side. To explain the product, the salesperson places the paper document to explain on the workbench 1322 as illustrated in FIG. 14B.

Figure 15A:
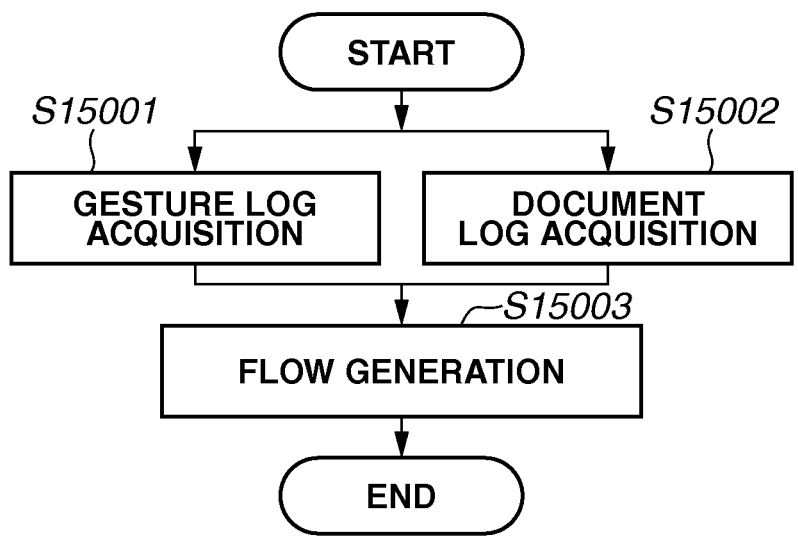

FIG. 15A is a flowchart schematically illustrating a flow performed by the information processing apparatus 1300. In the following description, flowcharts are implemented by the CPU 1301 executing a control program.

The salesperson activates the information processing apparatus 1300 upon starting explanation, whereby the processing according to the flowchart of FIG. 15A is performed. In step S15001, the information processing apparatus 1300 uses the gesture acquisition device 1306 to obtain gestures made by the salesperson and the customer. In step S15002, the information processing apparatus 1300 uses the imaging device 1305 to obtain the position and type of the paper document placed on the workbench 1322 and the position and type of electronic information projected on the workbench 1322 by the projection device 1307. In step S15003, the information processing apparatus 1300 obtains an explanation history of explanations made by the salesperson, and generates a flow thereof. The information processing apparatus 1300 performs step S15003 when triggered by the end of explanation of the salesperson. The salesperson may instruct the information processing apparatus 1300 about the end of explanation of the salesperson. The information processing apparatus 1300 may automatically determine the end of explanation by detecting an event such as power-off of the devices.

Figure 15B:
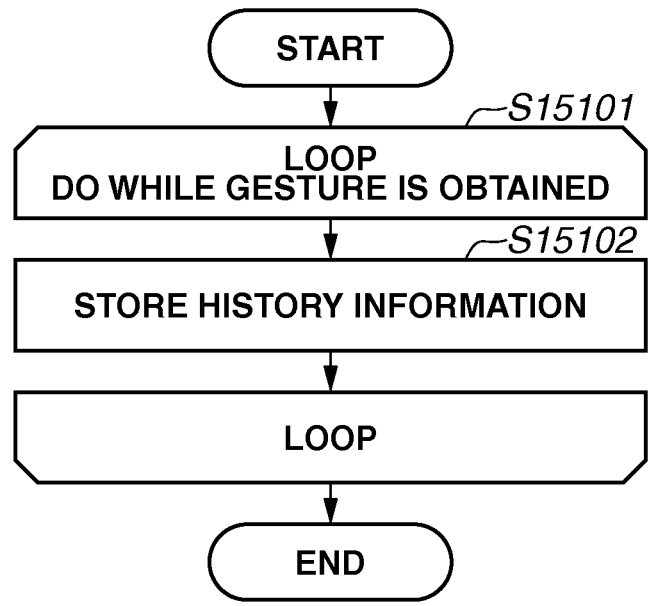

FIG. 15B is a flowchart illustrating details of the gesture log acquisition step S15001 of FIG. 15A. In step S15101, the information processing apparatus 1300 performs loop processing while the gesture acquisition device 1306 obtains gestures. The information processing apparatus 1300 may perform the processing of step S15101 according to an event that the gesture acquisition apparatus 1306 detects a gesture. The information processing apparatus 1300 may perform step S15101 at regular intervals. During explanation, the users may notify the information processing apparatus 1300 which part is being explained, for example, by moving a fingertip around the part of the document to explain, moving a fingertip along a diagonal line of the area, or explicitly specifying diagonal points of the area. In step S15101, the gesture acquisition device 1306 obtains such a gesture. Alternatively, the information processing apparatus 1300 may display frames explicitly enclosing areas by using the projection device 1306. In such a case, the users may make a gesture of touching and notifying of the area of contents to explain among the displayed areas with a fingertip, and the information processing apparatus 1300 may obtain the gesture.

In step S15102, the gesture acquisition device 1306 stores the detected gesture in the storage unit 1315 as history information. The information to be stored may be either coordinates in a three-dimensional space like FIG. 16B (gesture history example 1) or a determination result like FIG. 16C (gesture history example 2). In the following description, determination results like FIG. 16C is obtained. The information processing apparatus 1300 performs such processing until the end of explanation of the salesperson.

Figure 15C:
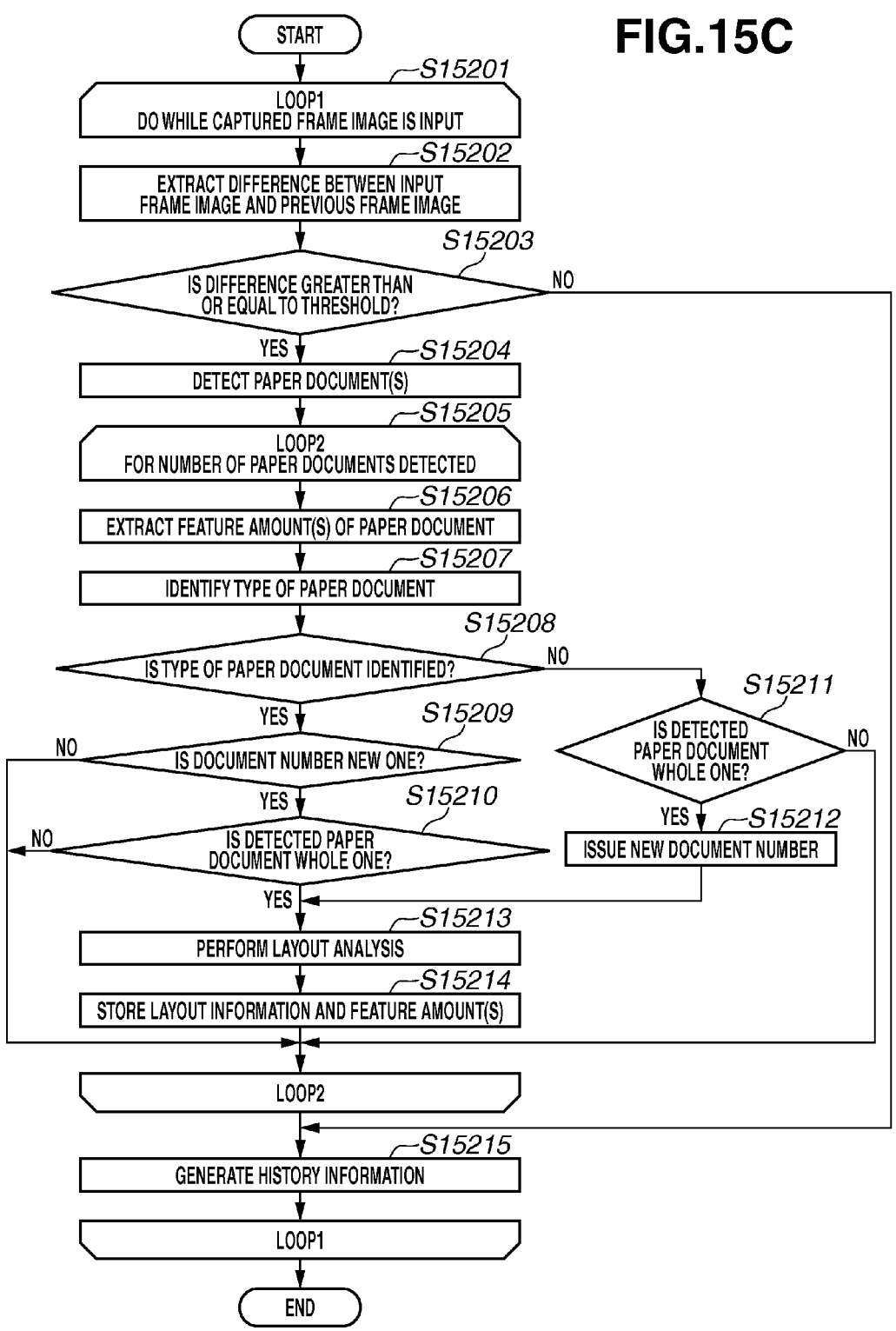

FIG. 15C is a flowchart illustrating details of the document log acquisition step S15002 of FIG. 15A. In step S15201, the information processing apparatus 1300 performs loop processing while a frame image captured by the image capturing unit 1310 is input. In step S15202, the information processing apparatus 1300 compares the input frame image and the previous frame image to extract difference. The information processing apparatus 1300 usually extracts difference in units of image pixels with the position of the imaging device 1305 fixed. In step S15203, the information processing apparatus 1300 determines the amount of difference. The information processing apparatus 1300 makes the determination by comparing the integral of the differences of the pixels with a threshold determined by the size of the input image. If the difference is greater than or equal to the threshold (YES in step S15203), the processing proceeds to step S15204. If the difference is smaller than the threshold (NO in step S15203), the processing proceeds to step S15215.

In step S15204, the information processing apparatus 1300 detects paper documents. The information processing apparatus 1300 performs the processing of step S15204 by inputting the image captured by the image capturing unit 1310 into the paper area detection unit 1312. The paper area detection unit 1312 detects a paper document by detecting the edges of four sides of a sheet from the image. The paper area detection unit 1312 performs the detection on all of a plurality of paper documents on the workbench 1322.

In step S15205, the information processing apparatus 1300 performs loop processing for each paper document detected in step S15204.

In step S15206, the feature extraction unit 1313 extracts a feature amount or amounts for identifying the paper document. The feature extraction unit 1313 clips the area of the paper document out of the input frame image, and extracts the feature amount(s) from inside the clipped area.

In step S15207, the document determination unit 1314 identifies the type of the paper document. The document determination unit 1314 performs matching with the feature amounts linked to the document numbers stored in the storage unit 1315 to identify the document number of the paper document in use.

In step S15208, the information processing apparatus 1300 branches the processing according to the result of the document identification processing performed in step S15207. If the type of the paper document is identified (YES in step S15208), the processing proceeds to step S15209. If the type of the paper document is not identified (NO in step S15208), the processing proceeds to step S15211.

In step S15209, the information processing apparatus 1300 branches the processing depending on whether the identified document number is a new one issued during the acquisition of the explanation history of the insurance product or an existing one. If the document number is a new one (YES in step S15209), the processing proceeds to step S15211. If the document number is an existing one (NO in step S15209), the processing exits the loop of the one detected paper document, returns to step S15205, and enters the loop of the next detected paper document.

In step S15210, the information processing apparatus 1300 determines whether the detected paper document is a whole one. The information processing apparatus 1300 determines the wholeness depending on whether all of the four sides detected by the detection processing performed in step S15204 are continuous. Here, the information processing apparatus 1300 may refer to the output of the gesture acquisition device 1306 and make the determination by using whether a gesture position overlaps the position of the paper document in process. If the paper document is a whole one (YES in step S15210), the processing proceeds to step S15213. If the paper document is not a whole one (NO in step S15210), the processing exits the loop of the one paper document detected and enters the loop of the next paper document detected.

In step S15211, the information processing apparatus 1300 also determines whether the detected paper document is a whole one. Here, the information processing apparatus 1300 performs similar processing to that of step S15210. If the paper document is a whole one (YES in step S15211), the processing proceeds to step S15212. If the paper document is not a whole one (NO in step S15211), the processing exits the loop of the one paper document detected and enters the loop of the next paper document detected.

In step S15212, the information processing apparatus 1300 issues a new document number. The processing of step S15212 is performed if the detected paper document does not coincide with any existing one and is a whole one.

In step S15213, the layout analysis unit 1316 performs a layout analysis on the paper document. In step S15214, the information processing apparatus 1300 stores layout information and the feature amount(s). The processing of step S15214 is performed only if the document number is a newly issued one. The information processing apparatus 1300 stores the feature amount(s) extracted linked to the document numbers in step S15206 and layout information generated in step S15213 into the storage unit 1315. Since the processing of step S15214 is performed if the paper document coincides with one having a newly issued document number, a plurality of feature amounts and a plurality of pieces of layout information will be stored for one new document number.

The information processing apparatus 1300 performs the processing of steps S15206 to S15214 on one paper document detected in step S15204, and then enters the loop of the next paper document.

In step S15215, the information processing apparatus 1300 generates history information. The information processing apparatus 1300 stores the document numbers of all the detected paper documents and the detected positions of the paper documents into the storage unit 1315.

The information processing apparatus 1300 performs the processing of steps S15202 to S15215 while frame images are input from the image capturing unit 1310. As a result, the information processing apparatus 1300 can obtain the document numbers of the documents used during explanation and the positions (coordinate positions with respect to the workbench 1322) of the documents illustrated in FIG. 16A as a history.

When the salesperson determines that a series of explanations is completed, the information processing apparatus 1300 generates an explanation flow according to the flowchart illustrated in FIG. 15D. Since a plurality of feature amounts and a plurality of pieces of layout information are obtained about each paper document having the same newly issued document number, the information processing apparatus 1300 performs narrowing processing.

In step S15301, the information processing apparatus 1300 performs loop processing for each newly issued document number. In step S15302, the feature amount generation unit 1318 generates at least one or more feature amounts. In step S15303, the layout information determination unit 1319 performs processing for generating a piece of layout information for one document. The layout information determination unit 1319 performs the processing by selecting a piece of layout information that maximizes the document area included in the captured image. The information processing apparatus 1300 performs the processing of steps S15302 to S15304 for each new document number.

Figure 17A:
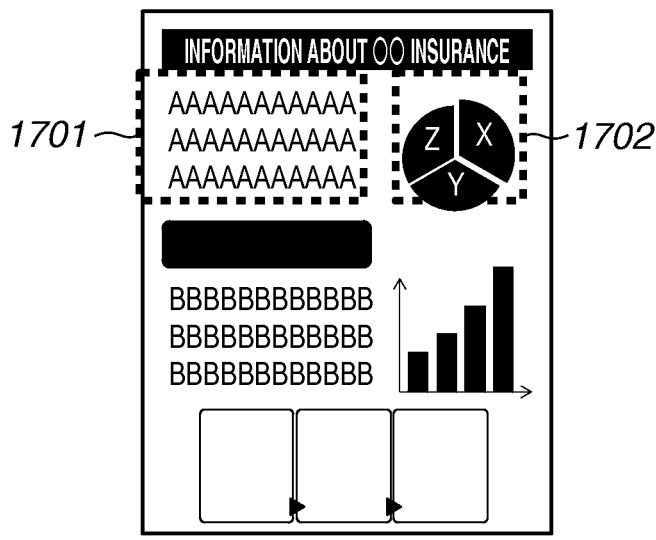
FIGS. 17A and 17B illustrate a layout analysis result and an explanation area according to the second exemplary embodiment.
Figure 17B:
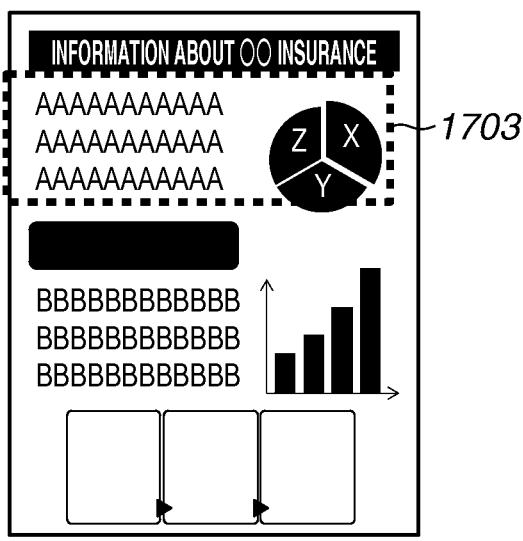

In step S15305, the information processing apparatus 1300 generates units of partial areas (hereinafter, also referred to as "section information") of the documents used for explanation from a detection history of the paper documents and electronic information, and a gesture history. The information processing apparatus 1300 identifies documents from the detection history of the paper documents and electronic information corresponding to portions of the paper documents and electronic information that are considered to be touched, included in the gesture history. The information processing apparatus 1300 then determines which positions in the documents the touched positions fall on. FIG. 16D illustrates the result. Using the layout information about the corresponding documents, the information processing apparatus 1300 then determines which areas are designated. FIG. 17A illustrates an example of layout information. A text area 1701 and a pie chart 1702 are extracted as areas of different attributes. For example, if the track of the coordinates of a gesture used for explanation surrounds both the areas, the information processing apparatus 1300 integrates the two areas into one explanation area as illustrated in FIG. 17B. Through such processing, the information processing apparatus 1300 obtains the areas used for explanation at respective times as illustrated in FIG. 16E. The information processing apparatus 1300 integrates continuous areas that are designated and used for explanation with a single gesture, whereby section information illustrated in FIG. 16F is generated.

In step S15306, the information processing apparatus 1300 outputs the section information as a series of pieces of section information. Through such processing, the information processing apparatus 1300 generates the order of explanation areas as an explanation flow like illustrated in FIG. 16G.

The information processing apparatus 1300 stores the document numbers, feature amounts, explanation areas (section information), and explanation flow generated by the foregoing processing into the storage unit 1315, and ends the processing.

The position coordinates illustrated in FIGS. 16A to 16D are coordinates with respect to the workbench 1322. The position coordinates illustrated in FIGS. 16E to 16G are position coordinates within the document.

Next, the use of accumulated explanation flows will be described. A conventional technique for sequential pattern mining can be applied to the accumulated explanation flows, or explanation order, to extract frequent sequential patterns. The sequential pattern mining refers to a technique for extracting frequently occurring partial sequences from sequence data. The sequential pattern mining can be implemented by using a method such as PrefixSpan and SPADE. An extracted sequential pattern is considered to be a display flow of electronic content data which salespeople frequently use in explaining an insurance product.

Figure 18:
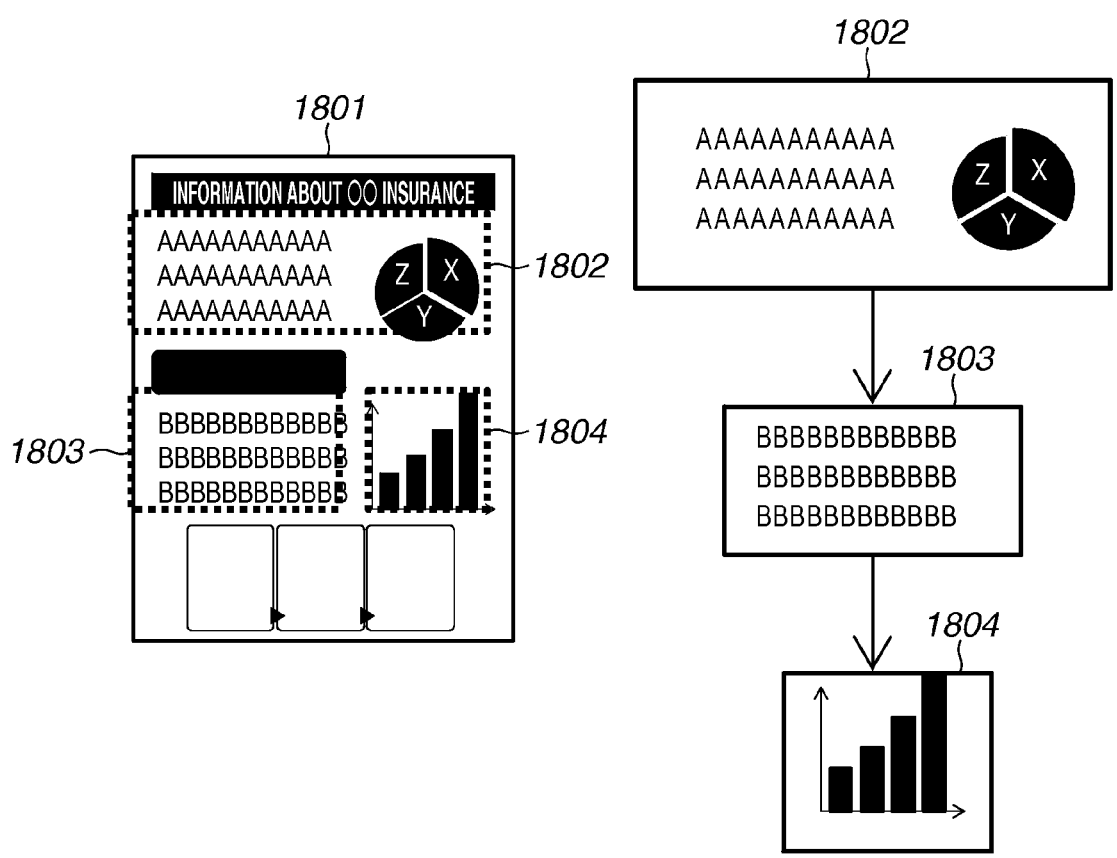
FIG. 18 illustrates an example of an explanation flow according to the second exemplary embodiment.

For example, as illustrated in FIG. 18, when a salesperson explains a brochure 1801 of an insurance product, it is often a case that an area 1802, an area 1803, and an area 1804 are displayed in this order. Such a display flow can be reused as know-how to explain the insurance product. Not only one but a plurality of display flows is extracted for one insurance product. The display flows can be analyzed in association with attribute information about customers. Such analysis can extract, for example, a display flow that is frequently employed for customers who have no previous knowledge of the insurance product, and a display flow that is frequently employed for customers who are thinking of a transfer from one insurance product to another. For example, customers thinking of a transfer have knowledge of insurance, and some part of the explanation may be rarely needed. Such a part, if detected, can be fed back not only to a front office department but also to a brochure generation department. For example, a brochure intended for customers who are thinking of a transfer can be generated in such a manner that the part of which detailed explanation is not needed occupies a smaller area and a more important part occupies a larger area on the sheet(s).

The flow acquisition by the information processing apparatus 1300 can be used to obtain the flows of experienced salespeople with high sales performance as well as those of newly-hired ones. A comparison between the flows of the newly-hired and experienced salespeople can be utilized for training the newly-hired salespeople.

The information processing apparatus 1300 can store the generated flows, for example, along with information about whether the business negotiations were successful. This enables flows to be classified into favorable and unfavorable flows. The information processing apparatus 1300 can extract a common pattern from a plurality of favorable flows for each document, and recommend a favorable explanation flow when a paper document is detected.

A method for recommending generated explanation order will be described.

Figure 19A:
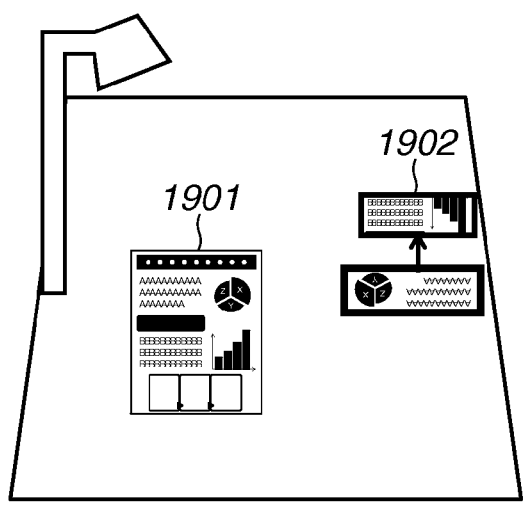
FIGS. 19A, 19B, and 19C illustrate modifications of an explanation flow according to a fourth exemplary embodiment.

FIG. 19A illustrates a state when a salesperson starts to explain an insurance product. When the salesperson places a brochure 1901 of the insurance product on the workbench 1322 of the information processing apparatus 1300, an image captured by the image capturing unit 1310 is input to the paper area detection unit 1312. The paper area detection unit 1312 detects the paper area in the image. The layout analysis unit 1316 clips the detected paper area, and the feature detection unit 1313 obtains feature amounts of the paper document. The document determination unit 1314 performs matching with the document numbers and feature amounts stored in the storage unit 1315 to identify the document number of the paper document in use. If the document number is identified, the information processing apparatus 1300 displays a flow 1902 for explaining the document. Then, the salesperson can explain the insurance product according to the order of the flow 1902 displayed.

The foregoing description has been given by using paper documents and displayed electronic information as an example. However, the information processing apparatus 1300 can also be used to give explanations using three-dimensional objects as well as paper documents.

The information processing apparatus 1300 can cooperate with a mixed reality system to obtain an operation history of virtual objects in a virtual space and objects in a real space and generate similar flows.

The second exemplary embodiment has dealt with the case where the paper document is placed on the workbench 1322 for explanation. However, the information processing apparatus 1300 can perform similar processing when the projection device 1307 projects an entire electronic document(s) for explanation.

In a third exemplary embodiment, the user of the information processing apparatus 1300 selects electronic information to project. The information processing apparatus 1300 can thus detect which piece of electronic data is projected on which position. The storage unit 1315 stores the electronic information obtained from the information processing apparatus 1300 and the projection positions of the pieces of electronic information along with time. The information processing apparatus 1300 can generate unique layout information about the documents from the electronic information in advance.

The information processing apparatus 1300 obtains gesture information in a similar manner to that of the first exemplary embodiment, whereby the gesture information, the positions of the respective pieces of electronic information, and the layout information about the respective pieces of electronic information needed for flow generation can be obtained. The information processing apparatus 1300 can thus generate a flow in a similar manner.

Figure 19B:
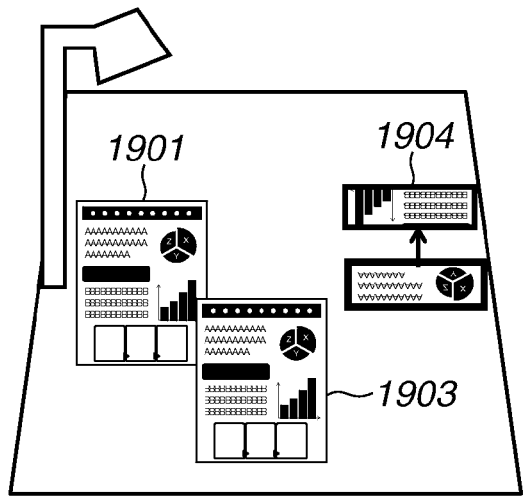
Figure 19C:
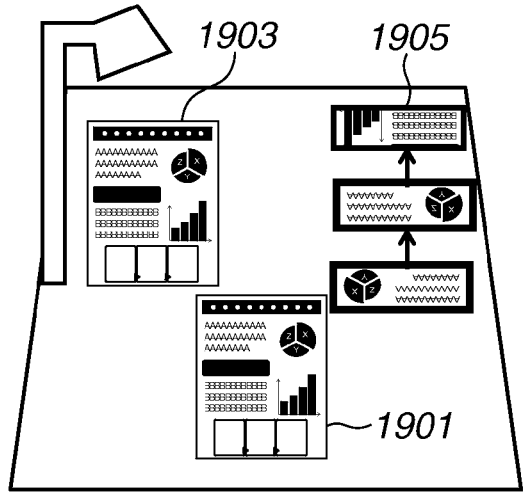

In the second exemplary embodiment, the information processing apparatus 1300 simply displays the generated explanation order for recommendation. In a fourth exemplary embodiment, the information processing apparatus 1300 may perform operations other than display depending on the explanation flow. FIG. 19B illustrates a case where a paper document 1901 is being explained when a paper document 1903 is placed on the workbench 1322. In such a case, the information processing apparatus 1300 changes the explanation flow to display when triggered by the detection of the paper document 1903. Here, the information processing apparatus 1300 changes the explanation flow to display according to the detected position of the paper document 1903.

For example, if the paper document 1903 is detected in a position closer to the customer or in a position overlapping the existing paper document 1901, the information processing apparatus 1300 displays the explanation flow of the paper document 1903 by priority. If such a condition is not satisfied, the information processing apparatus 1300 displays an explanation area of the paper document 1903 after that of the paper document 1901 being currently explained.

In such a manner, when the salesperson makes an operation different from the displayed explanation flow, the information processing apparatus 1300 can change the explanation flow according to the detected position of the paper document.

Figure 20:
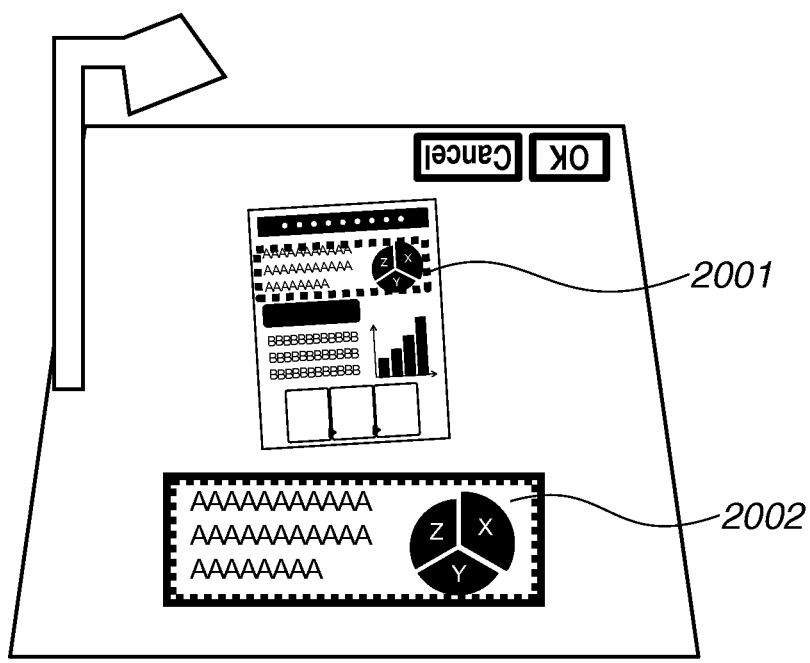
FIG. 20 illustrates a correction example of section information according to a fifth exemplary embodiment.

In the second exemplary embodiment, the information processing apparatus 1300 performs the processing for generating an explanation flow after the end of the explanation by the salesperson. In a fifth exemplary embodiment, the information processing apparatus 1300 may generate section information for generating an explanation flow during explanation. The salesperson may input a determination whether the generated section information is correct, and/or make a correction to the section information itself. If the section information is about a paper document, the information processing apparatus 1300 displays section information 2001 as illustrated in FIG. 20. The section information 2001 needs to be displayed according to the position of the paper document at that time. The information processing apparatus 1300 therefore obtains the latest position of the paper document, and performs coordinate conversion before displaying the section information 2001 so that the section information 2001 is properly displayed in that position. If the section information is about electronic information, the display position is known to the information processing apparatus 1300. The information processing apparatus 1300 then displays the section information to overlap the display of the electronic information. The salesperson checks the display, and if the display is as intended, presses an "OK" button. If the display is not as intended, the salesperson presses a "cancel" button. The salesperson can generate an intended frame by touching and moving the frame of the displayed section information with a finger to change the size of the frame and/or by touching and moving the inside of the frame to change the position of the frame. The salesperson can erase the entire section information generated by the information processing apparatus 1300, and generate section information by moving a finger along the circumscription of the area to be the section information. The section information to be generated may have an arbitrary shape other than a rectangular shape.

After the end of the explanation by the salesperson, the information processing apparatus 1300 may display the generated explanation flow to correct the explanation flow. If a paper document was used, the paper document may have already been removed from the workbench 1322. In such a case, the image of the paper document clipped from the image data obtained by the imaging device 1305 is stored and used to display the explanation flow.

The exemplary embodiments have been described in detail above. The present invention is not limited to the foregoing exemplary embodiments, and modifications may be made as appropriate without departing from the gist of the present invention. The exemplary embodiments may be combined with each other.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present invention, a relationship between pieces of contents can be obtained from history information about the positions of the pieces of contents. An appropriate flow for explaining a document can be generated from the history of actual explanation of the document.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-136172 filed Jun. 28, 2013 and No. 2013-155633 filed Jul. 26, 2013, which are hereby incorporated by reference herein in their entirety.

What is claimed is:

1. An information processing apparatus comprising:
a recognition unit configured to recognize a plurality of movable contents, wherein each of the plurality of contents is a partial area of an image;
an acquisition unit configured to acquire movement history information about positions of the plurality contents recognized by the recognition unit;
a storage unit configured to store time at which the positions of the pieces of contents are acquired by the acquisition unit and the positions in association with each other; and
a determination unit configured to refer to the storage unit and determine relationship between the contents based on the image from which the contents are generated and based on whether the contents are arranged within a predetermined position range.

2. The information processing apparatus according to claim 1, wherein the plurality of contents is configured to be moved by a user's operation.

3. The information processing apparatus according to claim 1, wherein the recognition unit is configured to further recognize an operation on the plurality of contents by a user who uses the contents, and
wherein the determination unit is configured to determine the relationship between the contents based on the movement history information about the positions and the operation.

4. The information processing apparatus according to claim 1, wherein the acquisition unit is configured to acquire the positions of the plurality of contents at regular time intervals.

5. The information processing apparatus according to claim 1, wherein the determination unit is configured to refer to the storage unit and determine the relationship between the contents based on whether two contents have changed their positions a predetermined number of times or more.

6. The information processing apparatus according to claim 1, wherein the determination unit is configured to refer to the storage unit and determine the relationship between the contents based on whether two contents are arranged within a predetermined position range for more than a certain time period.

7. An information processing method comprising:
recognizing a plurality of movable contents, wherein each of the plurality of contents is a partial area of an image;
obtaining movement history information about positions of the plurality of contents;
storing times at which the positions of the pieces of contents are acquired and the positions in association with each other; and
referring to the stored times, and determining a relationship between the contents based on the image from which the contents are generated and based on whether the contents are arranged within a predetermined position range.

8. A non-transitory computer-readable storage medium storing a program for causing a computer to function as:
a recognition unit configured to recognize a plurality of movable contents, wherein each of the plurality of contents is a partial area of an image;
an acquisition unit configured to acquire movement history information about positions of the plurality of contents;
a storage unit configured to store time at which the positions of the pieces of contents are acquired by the acquisition unit and the positions in association with each other; and
a determination unit configured to refer to the storage unit and determine relationship between the contents based on the image from which the contents are generated and based on whether the contents are arranged within a predetermined position range.

9. An information processing apparatus comprising:
a recognition unit configured to recognize a plurality of movable contents, wherein each of the plurality of contents is a partial area of an image;
an acquisition unit configured to acquire movement history information about positions of the plurality contents recognized by the recognition unit;
a storage unit configured to store time at which the positions of the pieces of contents are acquired by the acquisition unit and the positions in association with each other; and
a determination unit configured to refer to the storage unit and determine relationship between the contents based on the image from which the contents are generated and based on whether two contents have changed their positions a predetermined number of times or more.

10. An information processing method comprising:
recognizing a plurality of movable contents, wherein each of the plurality of contents is a partial area of an image;
acquiring movement history information about positions of the recognized plurality contents;
storing times at which the positions of the pieces of contents are acquired and the positions in association with each other; and
referring to the stored times, and determining a relationship between the contents based on the image from which the contents are generated and based on whether two contents have changed their positions a predetermined number of times or more.

11. A non-transitory computer-readable storage medium storing a program for causing a computer to function as:
recognizing a plurality of movable contents, wherein each of the plurality of contents is a partial area of an image;
acquiring movement history information about positions of the recognized plurality contents;
storing times at which the positions of the pieces of contents are acquired and the positions in association with each other; and
referring to the stored times, and determining a relationship between the contents based on the image from which the contents are generated and based on whether two contents have changed their positions a predetermined number of times or more.

* * * * *